US012562400B2

(12) United States Patent

Wang et al.

(10) Patent No.: US 12,562,400 B2

(45) Date of Patent: Feb. 24, 2026

(54) AQUEOUS HYDROGEL ELECTROLYTE SYSTEMS WITH WIDE ELECTROCHEMICAL STABILITY WINDOW

(71) Applicant: University of Maryland, College Park, College Park, MD (US)

(72) Inventors: Chunsheng Wang, Silver Spring, MD (US); Chongyin Yang, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 97 days.

(21) Appl. No.: 16/492,380

(22) PCT Filed: Mar. 9, 2018

(86) PCT No.: PCT/US2018/021805

§ 371 (c)(1),
(2) Date: Sep. 9, 2019

(87) PCT Pub. No.: WO2018/165585

PCT Pub. Date: Sep. 13, 2018

(65) Prior Publication Data

US 2021/0066755 A1 Mar. 4, 2021

Related U.S. Application Data

(60) Provisional application No. 62/469,923, filed on Mar. 10, 2017.

(51) Int. Cl.
H01M 10/10 (2006.01)
H01M 4/131 (2010.01)
(Continued)

(52) U.S. Cl.
CPC ....... H01M 10/0569 (2013.01); H01M 4/131 (2013.01); H01M 4/134 (2013.01);
(Continued)

(58) Field of Classification Search
CPC .. H01M 10/0569; H01M 4/131; H01M 4/134; H01M 4/136; H01M 4/505;
(Continued)

(56) References Cited

U.S. PATENT DOCUMENTS

2014/0306665 A1* 10/2014 Kim ...................... H01M 4/667
156/60
2016/0351968 A1 12/2016 Wang et al.
(Continued)

FOREIGN PATENT DOCUMENTS

CN 104600357 * 6/2015 ........ H01M 10/0565
EP 0821368 A2 1/1998

OTHER PUBLICATIONS

Machine translation of CN 104600357, retrived from <www. espacenet.com> on Nov. 5, 2021.*

(Continued)

*Primary Examiner* — Cynthia K Walls
(74) *Attorney, Agent, or Firm* — Sterne, Kessler, Goldstein & Fox P.L.L.C.

(57) ABSTRACT

The present invention is directed to aqueous electrolytes that comprise at least one metal salt and at least one polymer. The present invention is also directed to methods of making the electrolyte materials and methods of using the electrolyte materials in batteries and other electrochemical technologies.

19 Claims, 9 Drawing Sheets

(51) Int. Cl.

| | |
|---|---|
| *H01M 4/134* | (2010.01) |
| *H01M 4/136* | (2010.01) |
| *H01M 4/505* | (2010.01) |
| *H01M 4/525* | (2010.01) |
| *H01M 4/58* | (2010.01) |
| *H01M 10/0569* | (2010.01) |

(52) U.S. Cl.
CPC ........... *H01M 4/136* (2013.01); *H01M 4/505* (2013.01); *H01M 4/525* (2013.01); *H01M 4/5825* (2013.01); *H01M 2300/0022* (2013.01)

(58) Field of Classification Search
CPC .............. H01M 4/525; H01M 4/5825; H01M 2300/0022; H01M 10/052; H01M 10/0567; H01M 10/0568; Y02E 60/10
See application file for complete search history.

(56) References Cited

U.S. PATENT DOCUMENTS

| | | | | |
|---|---|---|---|---|
| 2017/0098856 A1* | 4/2017 | Zhamu | .................... | H01M 4/60 |
| 2017/0254818 A1* | 9/2017 | Haskins | ............. | G01N 33/6896 |
| 2017/0256818 A1* | 9/2017 | Eitouni | ............... | H01M 10/052 |
| 2017/0279159 A1* | 9/2017 | Suyama | ................ | H01M 4/525 |

OTHER PUBLICATIONS

Suo, Advanced high-voltage aqueous lithium battery enabled by "water-in-bisalt" electrolyte, Angewandte Chemie, 2016, 55, 7136-7141.*

Bruce, P.G., et al., "Li—O₂ and Li—S Batteries With High Energy Storage," *Nature Materials* 11(1):19-29, Nature Publishing Group, United Kingdom (Dec. 2012).

Busche, M.R., et al., "Systematical Electrochemical Study on the Parasitic Shuttle-effect in Lithium-sulfur-cells at Different Temperatures and Different Rates," *Journal of Power Sources* 259:289-299, Elsevier, Netherlands (Aug. 2014).

Chen, Z., and Dahn, J.R., "Methods to Obtain Excellent Capacity Retention in LiCoO₂ Cycled to 4.5 V," *Electrochimica Acta* 49(7):1079-1090, Elsevier, Netherlands (Mar. 2004).

Demir-Cakan, R., et al., "An Aqueous Electrolyte Rechargeable Li-ion/Polysulfide Battery," *Journal of Materials Chemistry A* 2(24):9025-9029, The Royal Society of Chemistry, United Kingdom (May 2014).

International Search Report and Written Opinion for International Application No. PCT/US2018/021805, ISA/US, Alexandria, Virginia, United States, mailed on Aug. 13, 2018, 7 pages.

Janz, G.J., et al., "Raman Studies of Sulfur-containing Anions in Inorganic Polysulfides. Potassium Polysulfides," *Inorganic Chemistry* 15(8):1755-1759, American Chemical Society Publications, United States (Aug. 1976).

Jayaprakash, N., et al., "Porous Hollow Carbon@sulfur Composites for High-power Lithium-sulfur Batteries," *Angewandte Chemie International Edition* 50(26):5904-5908, John Wiley & Sons, Inc., United States (Jun. 2011).

Ji, X., et al., "A Highly Ordered Nanostructured Carbon-sulphur Cathode for Lithium-sulphur Batteries," *Nature Materials* 8(6):500-506, Nature Publishing Group, United Kingdom (2009).

Ji, X., and Nazar, L.F., "Advances in Li—S Batteries," Journal of Material Chemistry 20(44):9821-9826, Royal Society of Chemistry, United Kingdom (Nov. 2010).

Larcher, D, and Tarascon, J.M., "Towards Greener and More Sustainable Batteries for Electrical Energy Storage," *Nature Chemistry* 7(1):19-29, Nature Publishing Group, United Kingdom (Jan. 2015).

Li, N., et al., "An Aqueous Dissolved Polysulfide Cathode for Lithium-sulfur Batteries," *Energy & Environmental Science* 7(10):3307-3312, The Royal Society of Chemistry, United Kingdom (2014).

Liang, X., et al., "A Highly Efficient Polysulfide Mediator for Lithium-sulfur Batteries," *Nature Communications* 6: 5682, Nature Publishing Group, United Kingdom (Jan. 2015).

Licht, S., "Aqueous Solubilities, Solubility Products and Standard Oxidation-reduction Potentials of the Metal Sulfides," *Journal of the Electrochemical Society* 135(12):2971-2975, Electrochemical Society, Inc., United States (1988).

Mikhaylik Y.V., and Akridge, J.R., "Polysulfide Shuttle Study in the Li/s Battery System," *Journal of Electrochemical Society* 151(11): A1969-A1976, Electrochemical Society, Inc., United States (2004).

Pang, Q., et al., "Surface-enhanced Redox Chemistry of Polysulphides on a Metallic and Polar Host for Lithium-sulphur Batteries," *Nature Communications* 5:4759, Nature Publishing Group, United Kingdom (2014).

Park, J.W., et al., "Solvent Effect of Room Temperature Ionic Liquids on Electrochemical Reactions in Lithium-sulfur Batteries," *The Journal of Physical Chemistry* 117(9):4431-4440, American Chemical Society Publications, United States (Feb. 2013).

Peng, X., et al., "A Zwitterionic Gel Electrolyte for Efficient Solid-state Supercapacitors," *Nature Communications* 7:11782, Nature Publishing Group, United Kingdom (May 2016).

Qie, L., et al., "A High Energy Lithium-sulfur Battery With Ultrahigh-loading Lithium Polysulfi De Cathode and Its Failure Mechanism," *Advanced Energy Materials* 6(7):1502459, Wiley VCH, Germany (Apr. 2016).

Smith, L.C., et al., "Sol-gel Encapsulated Lithium Polysulfide Catholyte and Its Application in Lithium-sulfur Batteries," *Materials Horizons* 3(2):137-144, The Royal Society of Chemistry, United Kingdom (2016).

Su, Y.S., et al., "A Strategic Approach to Recharging Lithium-sulphur Batteries for Long Cycle Life," *Nature Communications* 4:2985, Nature Publishing Group, United Kingdom (2013).

Suo, L., et al., "'Water-in-salt' Electrolytes Enable Green and Safe Li-ion Batteries for Large Scale Electric Energy Storage Applications," *Journal of Material Chemistry* 4:6639-6644, The Royal Society of Chemistry, United Kingdom (2016).

Tarascon, J.M., and Armand, M., "Issues and Challenges Facing Rechargeable Lithium Batteries," Nature 414(6861):359-367, Nature Publishing Group, United Kingdom (Nov. 2001).

Wessells, C., et al., "Investigations of the Electrochemical Stability of Aqueous Electroly les for Lithium Battery Applications," *Electrochemical and Solid-State Letters* 13(5):A59-A61, Electrochemical Society, Inc., United States (Mar. 2010).

Wu, C., et al., "Two-dimensional Vanadyl Phosphate Ultrathin Nanosheets for High Energy Density and Flexible Pseudocapacitors," *Nature Communications* 4:2431, Nature Publishing Group, United Kingdom (2013).

Wu, H.L., et al., "In Situ Raman Spectroscopy of Sulfur Speciation in Lithium-sulfur Batteries," *ACS Applied Materials and Interfaces* 7(3):1709-1719, Elsevier, Netherlands (Jan. 2015).

Yamin, H., et al., "Lithium Sulfur Battery: Oxidation/reduction Mechanisms of Polysulfides in THF Solutions," *Journal of The Electrochemical Society* 135(5):1045-1048, Electrochemical Society, Inc., United States (May 1988).

Yang, C., et al., "Unique Aqueous Li-ion/sulfur Chemistry With High Energy Density and Reversibility," *Proc Natl Acad Sci USA Early Publication* 114(24):6197-6202, National Academy of Sciences, United States (Jun. 2017).

Yeon, J.T., et al., "Raman Spectroscopic and X-ray Diffraction Studies of Sulfur Composite Electrodes During Discharge and Charge," Journal of The Electrochemical Society 159(8): A1308-A1314, Electrochemical Society, Inc., United States (2012).

Zhang, S., et al., "Recent Advances in Electrolytes for Lithium-sulfur Batteries," *Advanced Energy Materials* 5(16):1500117, John Wiley & Sons, Inc., United States (Apr. 2015).

Wang, X., et al., "An Aqueous Rechargeable Lithium Battery Using Coated Li Metal as Anode," *Scientific Reports* 3:1401, SpringerNature, United Kingdom (2013).

Stephan, A.M., "Review on gel polymer electrolytes for lithium batteries," European Polymer Journal 42:21-42, Elsevier, Netherlands (Jan. 2006).

(56)                    References Cited

OTHER PUBLICATIONS

Lagadec, M.F., et al., "Characterization and performance evaluation of lithium-ion battery separators," Nature Energy 4:16-25, Springer, Germany (Jan. 2019).

* cited by examiner

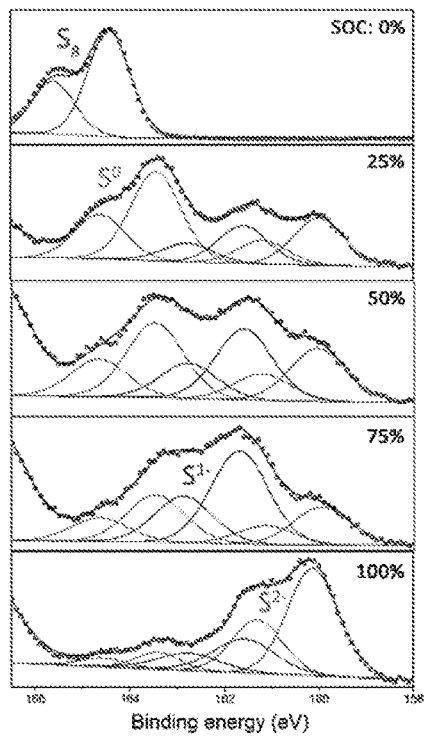
FIG. 5
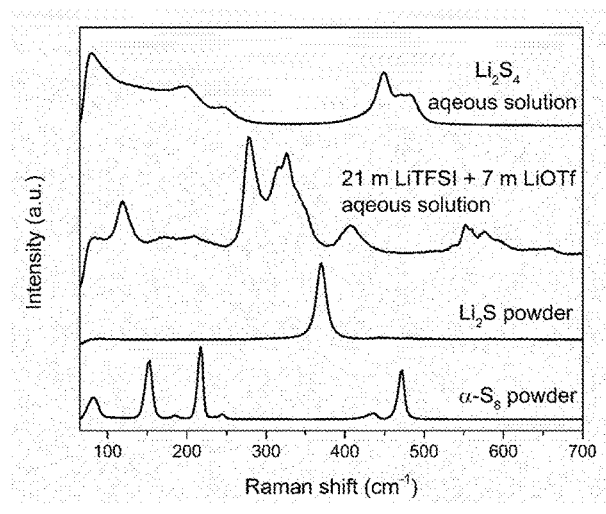
FIG. 6
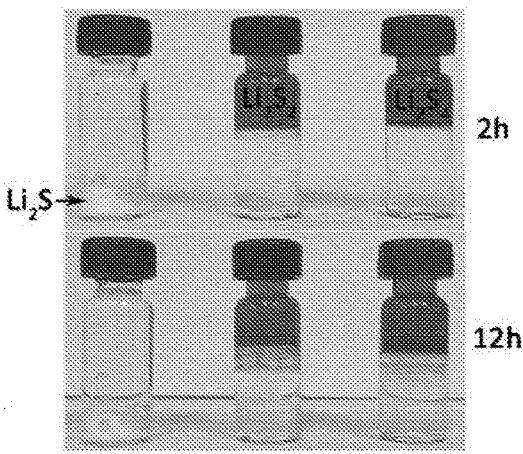
FIG. 7
FIG. 8

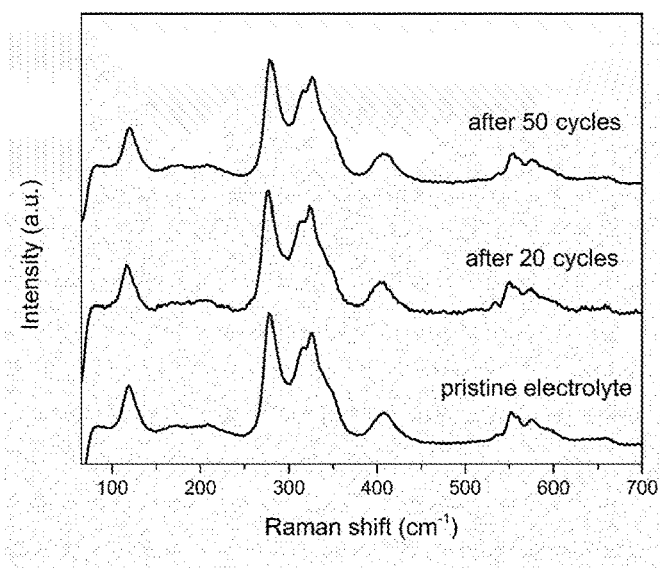
FIG. 16
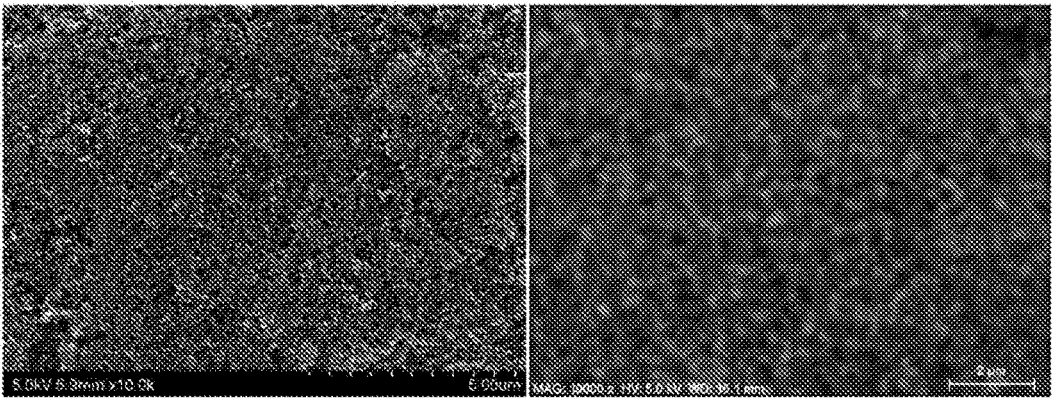
FIG. 17                         FIG. 18
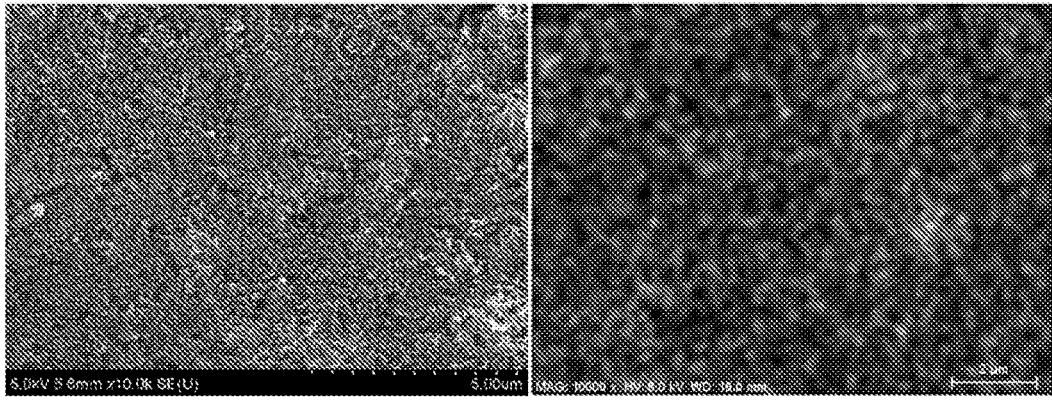
FIG. 19                         FIG. 20

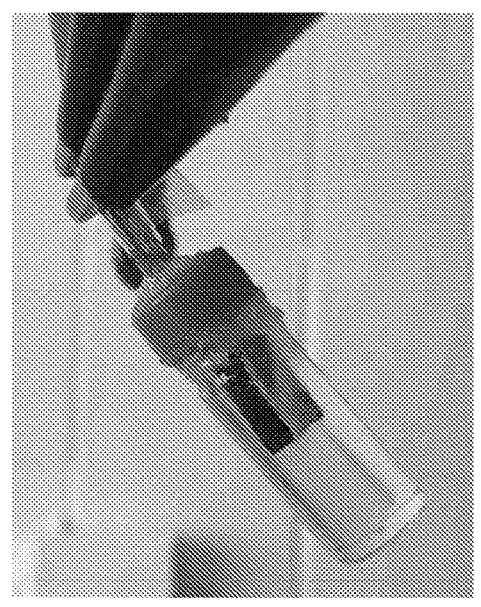
FIG. 25
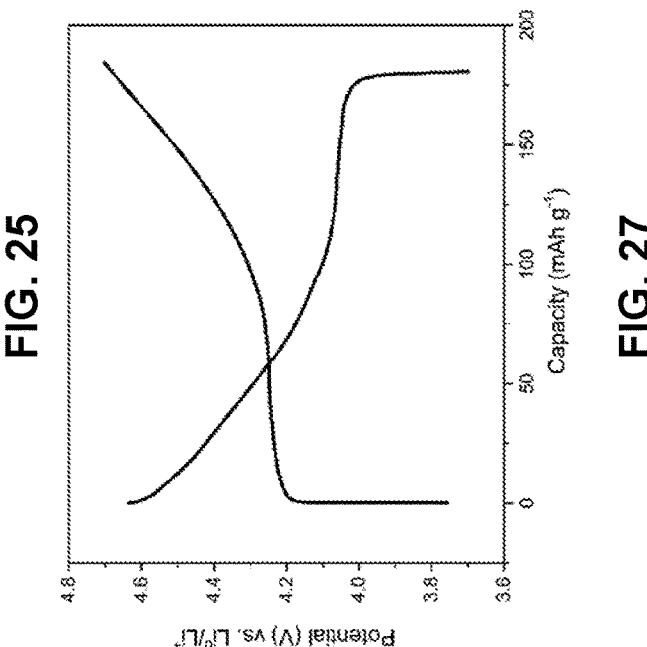
FIG. 27
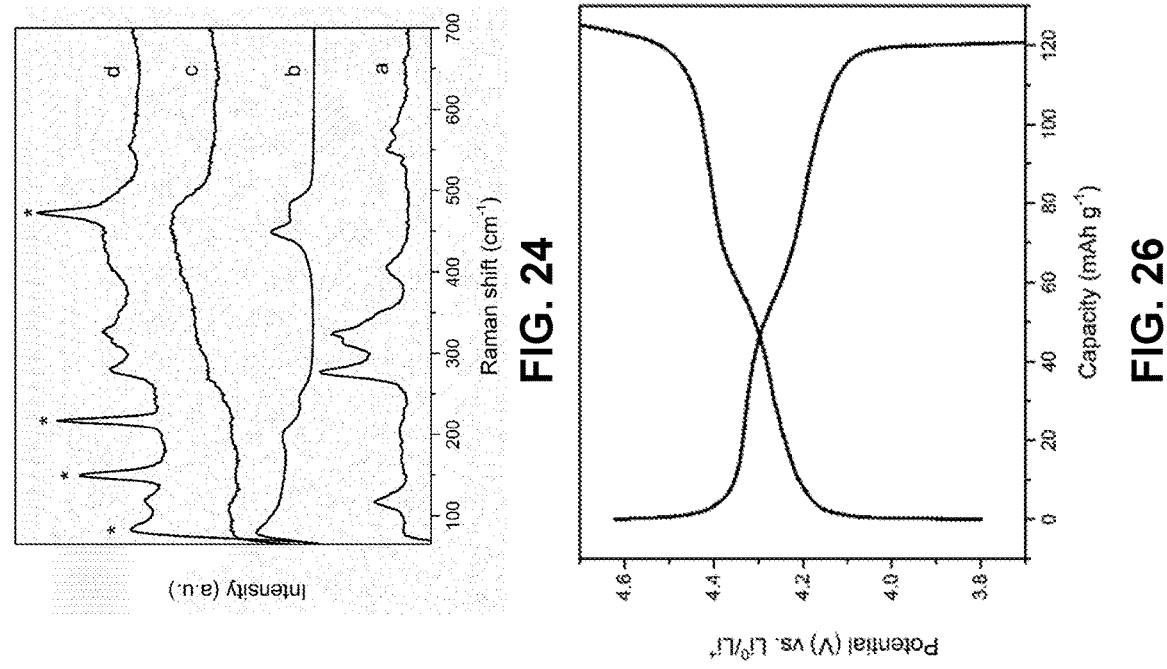
FIG. 24
FIG. 26

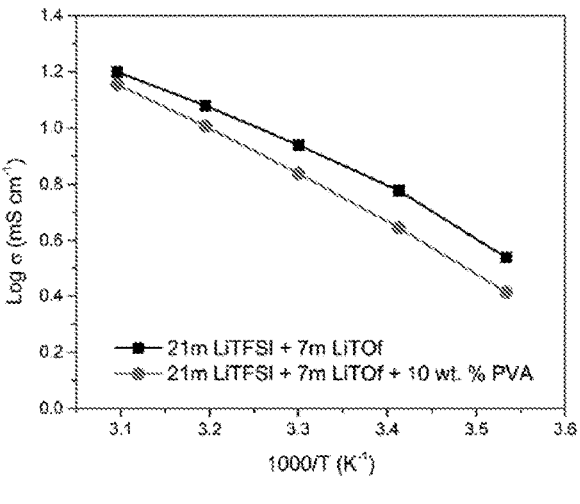
FIG. 34
FIG. 35
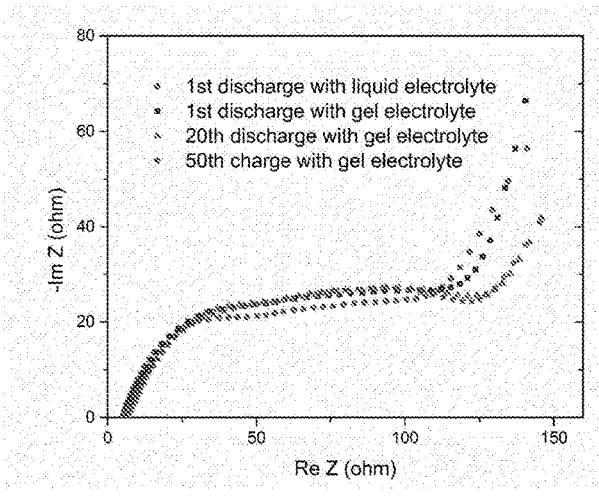
FIG. 36
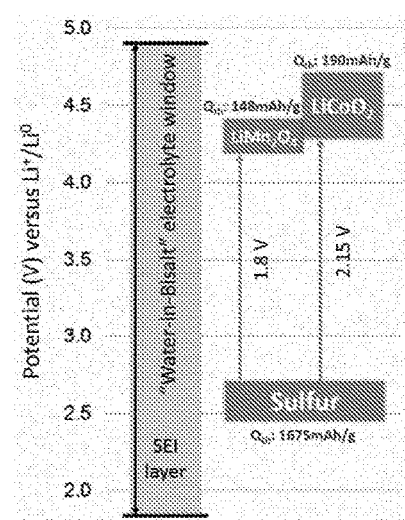
FIG. 37
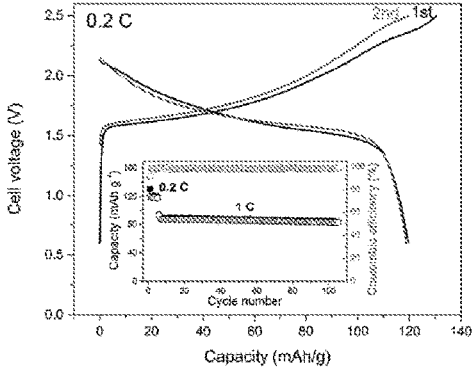
FIG. 38
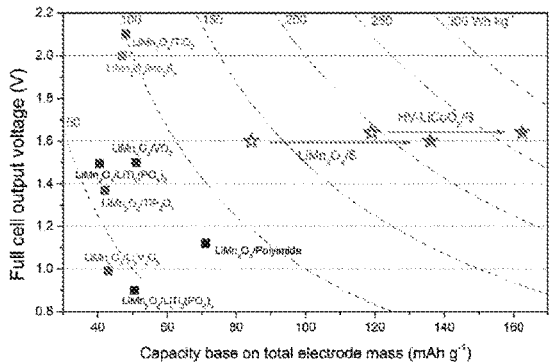
FIG. 39

AQUEOUS HYDROGEL ELECTROLYTE SYSTEMS WITH WIDE ELECTROCHEMICAL STABILITY WINDOW

STATEMENT REGARDING FEDERALLY SPONSORED RESEARCH OR DEVELOPMENT

This invention was made with government support under DE-SC0001160 awarded by the U.S. Department of Energy. The government has certain rights in the invention.

BACKGROUND OF THE INVENTION

Field of the Invention

The present invention is directed to aqueous electrolytes that comprise at least one metal salt and at least one polymer. The present invention is also directed to methods of making the electrolyte materials and methods of using the electrolyte materials in batteries and other electrochemical technologies.

Background

Aqueous lithium-ion batteries would be intrinsically safe, green, and low cost, but an aqueous electrolyte cannot support most high energy cathode and anode materials adopted by state-of-the-art lithium-ion batteries (LIB) due to the narrow electrochemical stability window of water (1.23 V). This window, defined by the reduction (hydrogen evolution) and oxidation (oxygen evolution) of water, was recently expanded to ~3.0 V by the formation of a solid electrolyte interphase (SEI) and reduction of water activity via the "super-concentration" concept (Suo, L, et al., *Science* 350, 938-943 (2015); Suo, L., et al., *Angewandte Chemie International Edition* 55, 7136-7141(2016); and Suo, L., et al., *J Mater Chem A* 4, 6639-6644 (2016)). Although a 2.3 V aqueous lithium-ion cell was constructed using such an electrolyte, the energy density achieved (~100 Wh/kg of electrode mass) was not optimal, nor was the expanded stability window fully utilized.

Electrical energy storage units are indispensable components in both smart-grids that harvest renewable energy resources and power systems of various electrified vehicles (J. M. Tarascon & M. Armand, *Nature* 414, 359-367 (2001); M. Armand & J. M. Tarascon, *Nature* 451, 652-657 (2008); and D. Larcher & J. M. Tarascon, *Nat Chem* 7, 19-29 (2015)). Although rechargeable LIB s have revolutionized the consumer electronics market in the past two decades with their energy density and excellent cycling stability, they still fail to meet the stringent energy, cost, safety, and environmental requirements for large-format applications, ranging from kilowatt-hours for electrified vehicles up to megawatt-hours for grid-storage—mostly due to the flammable and toxic non-aqueous electrolytes and low energy densities (<400 Wh/kg) provided by the electrochemical couples currently used in LIB (M. S. Whittingham, *Chem Rev* 104, 4271-4302 (2004)). Among the various "beyond lithium-ion" chemistries that are currently explored as potential replacement for LIB because of their ambitious energy densities (>500 Wh/kg), non-aqueous lithium-sulfur (Li—S) batteries based on elemental sulfur as cathode material (theoretical capacity 1,675 mAh/g) and a metallic Li anode seem to be the most practical. However, severe safety concerns associated with the dendrite growth of the metallic Li anode in ethereal-based electrolytes (Zhang, S., et al., *Advanced Energy Materials* 5, 1500117 (2015)), along with fast capacity decay and high self-discharge associated with parasitic shuttling of the intermediate polysulfide species in non-aqueous electrolytes, still prevents immediate commercialization. Meanwhile, like any non-aqueous system, the moisture-sensitive nature of these electrolytes would contribute a significant portion of cost to the eventual non-aqueous Li/S battery pack via the stringent requirements for moisture-exclusion infrastructure during the manufacturing, transport, processing, and packaging of the cells, in addition to the cost and weight of necessary safety and thermal management accessories.

Replacement of non-aqueous electrolytes by their aqueous counterparts would essentially eliminate safety, environmental, and at least part of the cost concerns. In particular, wide electrochemical stability windows (>3.0 V) comparable to those of non-aqueous electrolytes have been demonstrated in "water-in-salt" and "water-in-bisalt" electrolytes. Historically, it has been a challenge to use elemental sulfur as an active cathode material in aqueous electrolytes, mainly because of the high solubility of short chain lithium polysulfides (LiPS, $Li_2S_x$, x<6) and $Li_2S$ in aqueous media and the strong parasitic shuttling occurring thereafter (Licht, S., *J Electrochem Soc* 135, 2971-2975 (1988)). A compromise employs LiPS aqueous solution as the liquid active material (catholyte or anolyte), which can only allow the utilization of $Li_2S_4/Li_2S$ redox couple with 61% of theoretical specific capacity for sulfur (Li, N., et al., *Energy Environ Sci* 7, 3307-3312 (2014); Demir-Cakan, R., et al., *Journal of Materials Chemistry A* 2, 9025 (2014); and U.S. Patent Appl. Publication No. 2013/122334). The hydrogen evolution in those aqueous systems and the side reaction between the $Li_2S_4/Li_2S$ and $H_2O$ also significantly reduce the coulombic efficiency. Li metal anode can be used, but only after a Li-ion conducting ceramic layer is applied on the Li surface. Such a protection layer is known for its high cost and difficult scalability, and safety hazards potentially exist considering the fragile nature of the ceramic coating and reactivity of Li metal with water.

There is a need to prepare an aqueous electrolyte that is compatible with a wide range of metal salts. Thus, there is a need for improved aqueous electrolytes for use in aqueous lithium ion batteries.

BRIEF SUMMARY OF THE INVENTION

The present disclosure provides an electrochemical cell comprising:
(a) an anode;
(b) a cathode; and
(c) an electrolyte comprising at least one metal salt, at least one solvent comprising between about 1% and about 100% water by weight, and at least one hydrophilic polymer.

In some embodiments, the at least one metal salt in the electrolyte comprises a metal ion selected from the group consisting of $Li^+$, $Na^+$, $K^+$, $Mg^{2+}$, and $Al^{3+}$.

In some embodiments, the at least one metal salt in the electrolyte comprises an anion selected from the group consisting of bis(trifluoromethane sulfonyl)imide (TFSI), trifluoromethane sulfonate (OTf), bis(fluorosulfonyl)imide (FSI), tetrafluorophosphate ($BF_4$), hexafluorophosphate ($PF_6$), bis(pentafluoroethane sulfonyl) imide (BETI), 4,5-dicyano-2-trifluoromethanoimidazole (DCMI), [fluoro(non-afluorobutane) sulfonyl]imide (FNF), perchlorate ($ClO_4$), sulfate ($SO_4$), and nitrate ($NO_3$).

In some embodiments, the at least one metal salt in the electrolyte comprises an anion comprising at least one fluorine atom.

In some embodiments, the at least one metal salt in the electrolyte is selected from the group consisting of LiTFSI, LiOTf, LiFSI, LiBETI, LiDCMI, LiFNF, LiClO$_4$, LiSO$_4$, LiNO$_3$, NaTFSI, NaOTf, NaFSI, NaBETI, NaDCMI, NaFNF, NaClO$_4$, NaSO$_4$, NaNO$_3$, KTFSI, KOTf, KFSI, KBETI, KDCMI, KFNF, KClO$_4$, KSO$_4$, KNO$_3$, Mg(TFSI)$_2$, Mg(OTf)$_2$, Mg(FSI)$_2$, Mg(BETI)$_2$, Mg(DCMI)$_2$, Mg(FNF)$_2$, Mg(ClO$_4$)$_2$, Mg(SO$_4$)$_2$, Mg(NO$_3$)$_2$, Al(TFSI)$_3$, Al(OTf)$_3$, Al(FSI)$_3$, Al(BETI)$_3$, Al(DCMI)$_3$, Al(FNF)$_3$, Al(ClO$_4$)$_3$, Al(SO$_4$)$_3$, and Al(NO$_3$)$_3$.

In some embodiments, the at least one metal salt in the electrolyte is selected from the group consisting of LiTFSI, LiOTf, NaTFSI, NaFSI, KTFSI, KBETI, and Mg(TFSI)$_2$.

In some embodiments, the at least one metal salt in the electrolyte is selected from the group consisting of LiTFSI, LiOTf, LiNO$_3$, and Li$_2$SO$_4$.

In some embodiments, the at least one metal salt in the electrolyte comprises LiTFSI and LiOTf.

In some embodiments, the solvent in the electrolyte comprises at least 99% water.

In some embodiments, water is the only solvent in the electrolyte.

In some embodiments, the molal concentration of the metal salt in the electrolyte is between about 15 mol/kg and about 100 mol/kg.

In some embodiments, the at least one hydrophilic polymer in the electrolyte is selected from the group consisting of an acrylic, an amine, an amide, an imide, an ester, an ether, an olefin, a styrene, a vinyl acetal, a vinyl, a vinylidene chloride, a vinyl ester, a vinyl ether, a vinyl pyridine, and a vinyl pyrrolidone.

In some embodiments, the at least one hydrophilic polymer in the electrolyte is selected from the group consisting of a poly(N-isopropylacrylamide), a polyacrylamide, a poly(2-oxazoline), a polyethyleneimine, a poly(acrylic acid), a polymethacrylate, a poly(ethylene glycol), a poly(ethylene oxide), a poly(vinyl alcohol), and a poly(vinylpyrrolidine).

In some embodiments, the at least one hydrophilic polymer in the electrolyte is selected from the group consisting of poly(vinyl alcohol) and poly(ethylene glycol).

In some embodiments, the at least one hydrophilic polymer in the electrolyte comprises poly(vinyl alcohol).

In some embodiments, the weight ratio of the at least one hydrophilic polymer in the electrolyte is between about 1% and about 99%.

In some embodiments, the weight ratio of the at least one hydrophilic polymer in the electrolyte is between about 1% and about 20%.

In some embodiments, the cathode in the electrochemical cell is a lithium metal oxide or a lithium metal phosphate.

In some embodiments, the cathode in the electrochemical cell is a lithium metal oxide comprising Co, Ni, Mn, Fe, or V as a transition metal.

In some embodiments, the cathode in the electrochemical cell is a lithium metal phosphate comprising Co, Ni, Mn, Fe, or V as a transition metal.

In some embodiments, the cathode in the electrochemical cell is selected from the group consisting of LiFePO$_4$, LiMn$_2$O$_4$, LiCoO$_2$, LiNi$_{0.33}$Mn$_{0.33}$Co$_{0.33}$O$_2$, LiNi$_{0.6}$Mn$_{0.2}$Co$_{0.2}$O$_2$, LiNi$_{0.8}$Mn$_{0.1}$Co$_{0.1}$O$_2$, LiNi$_{0.5}$Mn$_{1.5}$O$_4$, LiN$_{0.8}$Co$_{0.15}$Al$_{0.05}$O$_2$, LiVPO$_4$F, and LiMnPO$_4$.

In some embodiments, the cathode in the electrochemical cell is selected from the group consisting of LiMn$_2$O$_4$, LiCoO$_2$, LiVPO$_4$F, and LiN$_{0.5}$Mn$_{1.5}$O$_4$.

In some embodiments, the cathode in the electrochemical cell comprises LiCoO$_2$ or LiMn$_2$O$_4$.

In some embodiments, the anode in the electrochemical cell is selected from the group consisting of lithium, magnesium, aluminum, molybdenum, zinc, chromium, iron, nickel, tin, lead, copper, silver, palladium, mercury, platinum, gold, sulfur, selenium, combinations thereof, metal alloys thereof, metal oxides thereof, metal phosphates thereof, and metal sulfides thereof.

In some embodiments, the anode in the electrochemical cell is selected from the group consisting of sulfur-Ketjenblack, LiVPO$_4$, Li$_4$Ti$_5$O$_{12}$, TiO$_2$, and Mo$_6$S$_8$.

In some embodiments, the anode in the electrochemical cell comprises sulfur-Ketjenblack.

In some embodiments, the electrochemical cell comprises a hydrophilic polymer comprising poly(vinyl alcohol), a cathode comprising LiMn$_2$O$_4$ or LiCoO$_2$, an anode comprising sulfur-Ketjenblack, and a solvent comprising the metal salts LiTFSI and LiOTf.

In some embodiments, the electrochemical cell is located in a rechargeable lithium battery.

In some embodiments, the electrochemical cell is sealed in an inert atmosphere.

In some embodiments, the electrochemical cell shows a capacity decay rate (mAh/g) at a C-rate of about 2.5 C between about 0.005% and about 0.1% per cycle.

In some embodiments, the electrochemical cell shows a capacity decay rate (mAh/g) at a C-rate of about 2.5 C between about 0.05% and about 0.1% per cycle.

In some embodiments, the electrochemical cell shows an energy density at a C-rate of about 0.5 C between about 20 Wh/kg and about 200 Wh/kg.

In some embodiments, the electrochemical cell shows an energy density at a C-rate of about 0.5 C between about 120 Wh/kg and about 150 Wh/kg.

The present disclosure provides a method for preparing an electrolyte for an electrochemical cell comprising:

(a) admixing at least one metal salt and a solvent, wherein the solvent comprises between about 1% and about 100% water by weight;

(b) admixing at least one hydrophilic polymer with the mixture of (a); and (c) heating the mixture of (b) at a temperature between about 60° C. and about 150° C.

In some embodiments, the method for preparing an electrolyte comprises admixing at least one metal salt comprising a metal ion selected from the group consisting of Li$^+$, Na$^+$, K$^+$, Mg$^{2+}$, and Al$^{3+}$.

In some embodiments, the method for preparing an electrolyte comprises admixing at least one metal salt comprising an anion selected from the group consisting of bis(trifluoromethane sulfonyl)imide (TF SI), trifluoromethane sulfonate (OTf), bis(fluorosulfonyl)imide (FSI), tetrafluorophosphate (BF$_4$), hexafluorophosphate (PF$_6$), bis(pentafluoroethane sulfonyl) imide (BETI), 4,5-dicyano-2-trifluoromethanoimidazole (DCMI), [fluoro(nonafluorobutane) sulfonyl]imide (FNF), perchlorate (ClO$_4$), sulfate (SO$_4$), and nitrate (NO$_3$).

In some embodiments, the method for preparing an electrolyte comprises admixing at least one metal salt comprising an anion comprising at least one fluorine atom.

In some embodiments, the method for preparing an electrolyte comprises admixing at least one metal salt selected from the group consisting of LiTFSI, LiOTf, LiFSI, LiBETI, LiDCMI, LiFNF, LiClO$_4$, LiSO$_4$, LiNO$_3$, NaTFSI, NaOTf, NaFSI, NaBETI, NaDCMI, NaFNF, NaClO$_4$, NaSO$_4$, NaNO$_3$, KTFSI, KOTf, KFSI, KBETI, KDCMI, KFNF, KClO$_4$, KSO$_4$, KNO$_3$, Mg(TFSI)$_2$, Mg(OTf)$_2$, Mg(FSI)$_2$, Mg(BETI)$_2$, Mg(DCMI)$_2$, Mg(FNF)$_2$, Mg(ClO$_4$)$_2$,

5

$Mg(SO_4)_2$, $Mg(NO_3)_2$, $Al(TFSI)_3$, $Al(OTf)_3$, $Al(FSI)_3$, $Al(BETI)_3$, $Al(DCMI)_3$, $Al(FNF)_3$, $Al(ClO_4)_3$, $Al(SO_4)_3$, and $Al(NO_3)_3$.

In some embodiments, the method for preparing an electrolyte comprises admixing at least one metal salt selected from the group consisting of LiTFSI, LiOTf, NaTFSI, NaFSI, KTFSI, KBETI, and $Mg(TFSI)_2$.

In some embodiments, the method for preparing an electrolyte comprises admixing at least one metal salt comprising LiTFSI and LiOTf.

In some embodiments, the method for preparing an electrolyte comprises admixing a solvent comprising at least 99% water.

In some embodiments, the method for preparing an electrolyte comprises admixing a solvent wherein water is the only solvent.

In some embodiments, the method for preparing an electrolyte comprises admixing a metal salt wherein the molal concentration of the metal salt in the electrolyte is between about 15 mol/kg and about 100 mol/kg.

In some embodiments, the method for preparing an electrolyte comprises admixing at least one hydrophilic polymer selected from the group consisting of an acrylic, an amine, an amide, an imide, an ester, an ether, an olefin, a styrene, a vinyl acetal, a vinyl, a vinylidene chloride, a vinyl ester, a vinyl ether, a vinyl pyridine, and a vinyl pyrrolidone.

In some embodiments, the method for preparing an electrolyte comprises admixing at least one hydrophilic polymer selected from the group consisting of a poly(N-isopropylacrylamide), a polyacrylamide, a poly(2-oxazoline), a poly-ethyleneimine, a poly(acrylic acid), a polymethacrylate, a poly(ethylene glycol), a poly(ethylene oxide), a poly(vinyl alcohol), and a poly(vinylpyrrolidine).

In some embodiments, the method for preparing an electrolyte comprises admixing at least one hydrophilic polymer comprising poly(vinyl alcohol).

In some embodiments, the method for preparing an electrolyte comprises admixing at least one hydrophilic polymer wherein the weight ratio of the at least one hydrophilic polymer in the electrolyte is between about 1% and about 99%.

In some embodiments, the method for preparing an electrolyte comprises admixing at least one hydrophilic polymer wherein the weight ratio of the at least one polymer in the electrolyte is between about 1% and about 20%.

In some embodiments, the method for preparing an electrolyte comprises admixing at least one hydrophilic polymer comprising poly(vinyl alcohol) and a solvent comprising the metal salts LiTFSI and LiOTf.

The present disclosure provides a method for preparing an electrochemical cell comprising:
(a) preparing an electrolyte;
(b) providing an anode; and
(c) providing a cathode.

In some embodiments, the method of preparing an electrochemical cell comprises providing a cathode comprising a lithium metal oxide or a lithium metal phosphate.

In some embodiments, the method of preparing an electrochemical cell comprises providing a cathode comprising a lithium metal oxide comprising Co, Ni, Mn, Fe, or V as a transition metal.

In some embodiments, the method of preparing an electrochemical cell comprises providing a cathode comprising a lithium metal phosphate comprising Co, Ni, Mn, Fe, or V as a transition metal.

In some embodiments, the method of preparing an electrochemical cell comprises providing a cathode selected from the group consisting of $LiFePO_4$, $LiMn_2O_4$, $LiCoO_2$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, $LiVPO_4F$, and $LiMnPO_4$.

In some embodiments, the method of preparing an electrochemical cell comprises providing a cathode selected from the group consisting of $LiMn_2O_4$, $LiCoO_2$, $LiVPO_4F$, and $LiN_{0.5}Mn_{1.5}O_4$.

In some embodiments, the method of preparing an electrochemical cell comprises providing a cathode comprising $LiCoO_2$ or $LiMn_2O_4$.

In some embodiments, the method of preparing an electrochemical cell comprises providing an anode selected from the group consisting of lithium, magnesium, aluminum, molybdenum, zinc, chromium, iron, nickel, tin, lead, copper, silver, palladium, mercury, platinum, gold, sulfur, selenium, combinations thereof, metal alloys thereof, metal oxides thereof, metal phosphates thereof, and metal sulfides thereof.

In some embodiments, the method of preparing an electrochemical cell comprises providing an anode selected from the group consisting of sulfur-Ketjenblack, $LiVPO_4$, $Li_4Ti_5O_{12}$, $TiO_2$, and $Mo_6S_8$.

In some embodiments, the method of preparing an electrochemical cell comprises providing an anode comprising sulfur-Ketjenblack.

In some embodiments, the method of preparing an electrochemical cell comprises providing a cathode comprising $LiMn_2O_4$ or $LiCoO_2$, an anode comprising sulfur-Ketjenblack, and an electrolyte comprising poly(vinyl alcohol) and the metal salts LiTFSI and LiOTf.

BRIEF DESCRIPTION OF THE DRAWINGS

FIG. 5 are ex-situ x-ray photoelectron spectroscopy (XPS) S 2p spectra of the S-KB composite anode in a full cell after being charged to specific states. Dotted lines indicate experimental data with solid lines indicating overall fitted data and fitted individual chemical states: $2p_{3/2}$ ($S^8$) 164.4 eV;)$2p_{3/2}$($S^0$) 163.5 eV; $2p_{3/2}$ ($S^{1-}$) 161.7 eV; and $2_{3/2}$ ($S^{2-}$) 159.9 eV.

FIG. 6 is a graph of the estimated content ratios of element $S_8$, $Li_2S$, and LiPS formulas at specific states of charge.

FIG. 7 are pictures showing the insolubilities for $Li_2S$ and short chain LiPS ($Li_2S_2$ and $Li_2S_4$) in a water-in-bisalt electrolyte. $Li_2S$ white power remain insoluble in clear aqueous electrolyte for 12 hours. Jacinth solution on the top of bottle is $Li_2S_2$ or $Li_2S_4$ dissolved in water phase, which is separated with the clear aqueous electrolyte (salt phase) on the bottom.

FIG. 8 is a Raman spectra of element sulfur powder, $Li_2S$ powder, electrolyte, and $Li_2S_4$ aqueous solution.

FIG. 16 is an in-situ Raman spectra of 21 m LiTFSI+7 m LiOTf electrolyte in full cell before and after the 20th and 50th cycle at the rate of 0.5 C.

FIG. 17 is a SEM image of S-KB anode after the 1st charge at the rate of 0.5 C.

FIG. 18 is an energy-dispersive X-ray spectroscopy (EDX) analysis of sulfur after a 1st charge at the rate of 0.5 C.

FIG. 19 is a SEM image of S-KB anode after a 20th charge at the rate of 0.5 C.

FIG. 20 is an energy-dispersive X-ray spectroscopy (EDX) analysis of sulfur after a 20th charge at the rate of 0.5 C.

FIG. 24 are Raman spectra for (a) the bottom part (is a yellow color) and (b) the top part (is a jacinth color) in the mixture solution of LiPS solution and 21 m LiTFSI+7 m LiOTf electrolyte in FIG. 7 (c) the bottom part of the mixture of LiPS solution and 21 m LiTFSI electrolyte in FIG. 23, and (d) the solid white particles diffused into the bottom part of the mixture of LiPS solution and 21 m LiTFSI+7 m LiOTf electrolyte. The peaks marked by stars were determined as element $S_g$.

FIG. 25 is a photographic image of a S-KB anode and $LiMn_2O_4$ full cell assembled in a quartz bottle after 200 cycles at 0.5 C. A cluster of white small solid partials diffusing into the electrolyte was clearly shown.

FIG. 26 is a voltage profile of $LiMn_2O_4$ at constant current (0.2 C) in 21 m LiTFSI+7 m LiOTf solution as aqueous electrolyte, collected in a three-electrode device with S-KB as working electrodes and Ag/AgCl as reference electrode. The specific capacities are based on the mass of active materials.

FIG. 27 is a voltage profile of high voltage $LiCoO_2$ (HV-$LiCoO_2$) at constant current (0.2 C) in 21 m LiTFSI+7 m LiOTf solution as aqueous electrolyte, collected in a three-electrode device with S-KB as working electrodes and Ag/AgCl as reference electrode. The specific capacities are based on the mass of active materials.

Figure 28:
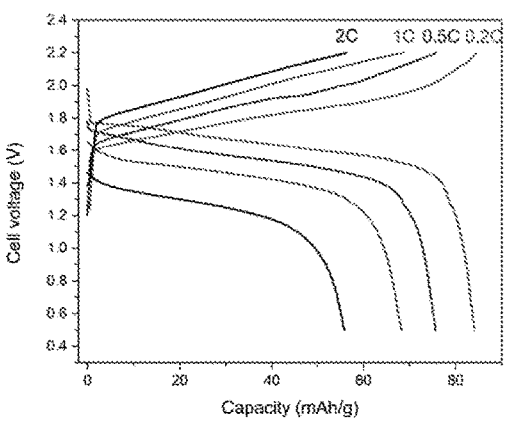

FIG. 28 is a voltage profile of full cell with a S-KB anode and $LiMn_2O_4$ cathode in a water-in-bisalt electrolyte at current densities ranging from 0.2 C to 2 C.

Figure 29:
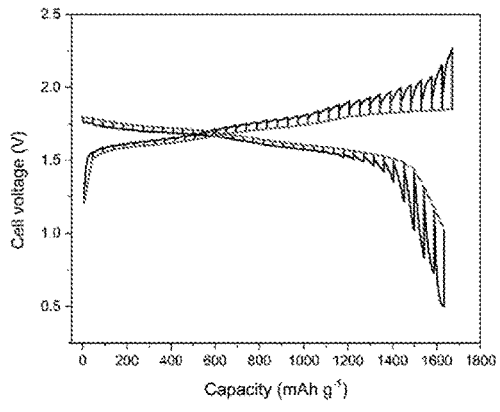

FIG. 29 is a Galvanostatic intermittent titration experiment (GITT) characterization of a S-KB cathode in a water-in-bisalt electrolyte with 5 times higher capacity of $LiMn_2O_4$ cathode to avoid the interference by two plateaus of $LiMn_2O_4$. The solid curve is quasi-equilibrium potential of sulfur at different lithiation/delithiation stages which was constructed from the last data point of each open circuit voltage (OCV) period.

Figure 30:
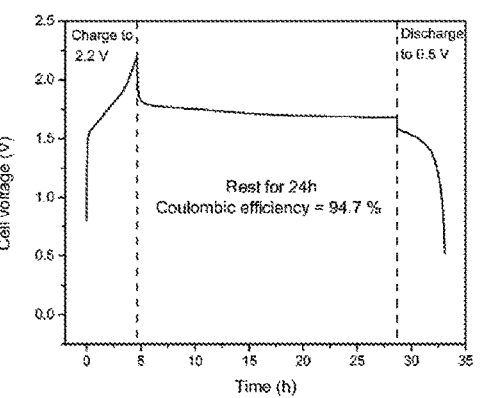

FIG. 30 is a graph showing the OCV decay in 24-hour rest of the full cell with full electrolyte at fully charged state of 2.2 V at 0.2 C. The self-discharge was evaluated by comparison with the columbic efficiency and the capacity loss after resting.

Figure 31:
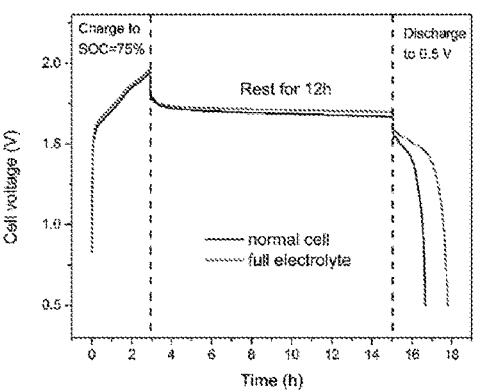

FIG. 31 is a graph comparing the OCV decays in 12-hour rest between the normal cell and full electrolyte cell at SOC of 75% at 0.2 C. The self-discharge was evaluated by comparison with the columbic efficiency and the capacity loss after resting.

Figure 32:
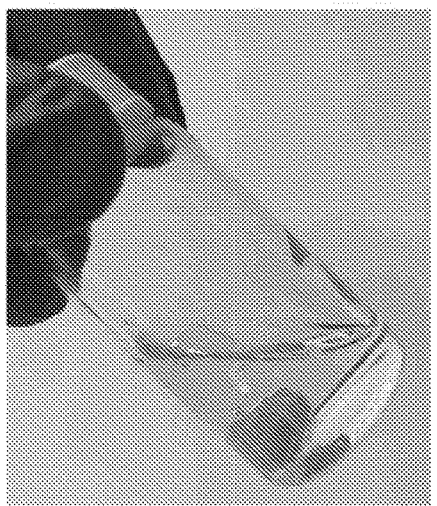

FIG. 32 is a photographic image of the transparent water-in-bisalt hydrogel electrolyte at 95° C.

Figure 33:
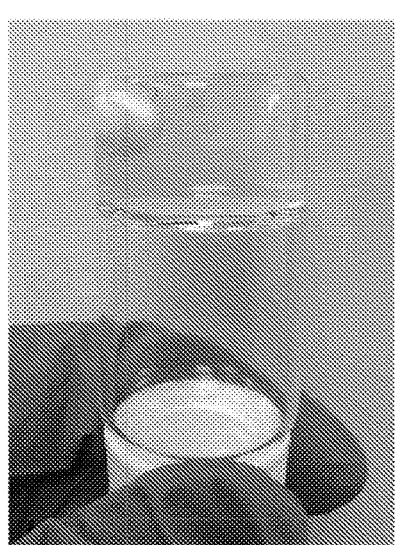

FIG. 33 is a photographic image of the transparent water-in-bisalt hydrogel electrolyte at room temperature.

FIG. 34 are Arrhenius plots of lithium ion conductivity (a) for the water-in-bisalt liquid electrolyte and hydrogel electrolyte over a temperature range of 10° C.~50° C.

FIG. 35 is a voltage profiles of full cell with S-KB anode and $LiMn_2O_4$ cathode in a water-in-bisalt hydrogel electrolyte at current densities of 0.2 C.

FIG. 36 is an electrochemical impedance spectroscopy spectra of a S-KB/$LiMn_2O_4$ full cell with liquid and gel electrolytes at different cycles at 0.5 C.

FIG. 37 is an illustration of S-KB/$LiMn_2O_4$ and S-KB/ HV-$LiCoO_2$ full-cell in a water-in-bisalt electrolyte with expanded electrochemical stability window.

FIG. 38 are voltage profiles of a S-KB/HV-$LiCoO_2$ full cell in a water-in-bisalt GPE at current densities of 0.2 C. The inset is capacity stability and Coulombic efficiency during cycles.

FIG. 39 is a graphical representation comparing voltage, capacity, and energy density of aqueous $Li^+$/S batteries with all reported aqueous electrochemical couples.

DETAILED DESCRIPTION OF THE INVENTION

As used herein, the singular terms "a" and "the" are synonymous and used interchangeably with "one or more" and "at least one," unless the language and/or context clearly indicates otherwise.

All numbers in this description indicating amounts, ratios of material, physical properties of materials and/or use are to be understood as modified by the word "about," except otherwise explicitly indicated.

The term "about" is used herein to mean the given number plus or minus 1 to 10%.

The term "aqueous electrolyte" as used herein, refers to an electrolyte composition that contains water as the only solvent.

The term "hybrid electrolyte" refers to an electrolyte composition that contains water and at least one non-aqueous solvent. In some embodiments, the content of water in the hybrid electrolyte is between 1% and 99%.

The term "non-aqueous electrolyte" refers to an electrolyte composition that contains aprotic or protic solvents in which the content of water is less than 1%.

The term "cathode" is used herein to refer to the electrode where electrochemical reduction occurs during the discharging process.

The term "anode" is used herein to refer to the electrode where electrochemical oxidation occurs during the discharging process.

The "molality" (m) of a solution is defined as the amount of substance (in moles) of solute, $n_{solute}$, divided by the mass (in kg) of the solvent, $m_{solvent}$.

$$molality = n_{solute}/m_{solvent}$$

The unit for molality (m) is moles per kilogram (mol/kg).

The present disclosure relates to highly reversible aqueous $Li^+/S$ chemistry using a simple sulfur/carbon composite as anode and $LiMn_2O_4$ and $LiCoO_2$ as cathodes. A unique lithiation/delithiation mechanism of sulfur in a water-in-bisalt electrolyte was revealed via in-situ and ex-situ spectroscopic studies during electrochemical reactions. High capacity close to the theoretical value of sulfur (1327 mAh/g) can be achieved with excellent reversibility, as evidenced by capacity retention of 86% for 1000 cycles. It is thought that this is achieved by the high concentration of Li salts, which effectively suppresses the dissolution and shuttling of polysulfide and $Li_2S$ species that have been a problem with non-aqueous Li/S chemistry. When a sulfur anode was paired with typical lithium battery cathode materials such as $LiMn_2O_4$ or high-voltage $LiCoO_2$, energy densities of ~135-200 Wh/kg were delivered. These high aqueous battery energy densities suggest that improved safety, cost, environmental considerations, and energy density can be achieved with these materials for large-scale applications such as smart-grid storage or automotive power systems.

In some embodiments, the present disclosure provides aqueous electrolytes comprising at least one metal salt and at least one polymer, electrochemical cells with aqueous electrolytes comprising at least one metal salt and at least one polymer, and rechargeable batteries with aqueous electrolytes comprising at least one metal salt and at least one polymer.

Electrochemical Cells

An electrochemical cell comprises two half-cells. Each half-cell comprises an electrode and an electrolyte. The two half-cells can use the same electrolyte, or they can use different electrolytes. The chemical reactions in the cell may involve the electrolyte, the electrodes, or an external substance (as in fuel cells that may use hydrogen gas as a reactant). In a full electrochemical cell, species from one half-cell lose electrons (oxidation reaction) to their electrode while species from the other half-cell gain electrons (reduction reaction) from their electrode.

An electrochemical cell includes two electrodes, a positive electrode, called the cathode and, a negative electrode, called the anode, an insulator separating the electrodes so the battery does not short out, and an electrolyte that transports the ionic component of the chemical reaction between the two electrodes and forces the electronic component to be transported outside the cell. The anode is the reductant of the chemical reaction, the cathode the oxidant, so on discharge electrons flow from the anode to the cathode and are charge-compensated by cations flowing inside the cell from the anode to the cathode. This process transforms the chemical energy of the reaction into electric power in the external circuit by delivering a current at a voltage for a time $A_t$ until the chemical reaction is completed. If the charged cell has the electric current cut off, which is called an open-circuit, electrons cannot flow, but the ions inside the cell can flow without being charge-compensated. As a result, the cathode becomes positively charged on open-circuit, which is why the cathode is called the positive electrode.

In some embodiments, the present invention provides an electrochemical cell comprising:

(a) an anode;

(b) a cathode; and (c) an electrolyte comprising at least one metal salt, at least one solvent comprising between about 1% and about 100% water by weight of the solvent, and at least one polymer.

In some embodiments, the electrochemical cell includes a separator between the positive electrode and the negative electrode. In some embodiments, the separator is subjected to hydrophilic treatment or perforated such that the separator can be permeated with an aqueous electrolyte solution, allowing ions to pass through the separator. The separator may be any separator that is commonly used in batteries. Examples of the separator include polymer nonwoven fabrics, such as polypropylene nonwoven fabric and poly (phenylene sulfide) nonwoven fabric, and macroporous membranes of olefin resins, such as polyethylene and polypropylene. These can be used alone or in combination. In some embodiments, the separator is a glass fiber.

Aqueous Hydrogel Electrolyte

In some embodiments, the aqueous electrolyte is a water-in-salt or a water-in-bisalt electrolyte. As used herein, the term "water-in-salt" means that the weight ratio of salt to solvent or volume ratio of salt to solvent exceed 1.0. In some embodiments, the weight or volume of salt is more than solvent. As used herein, the term "water-in-bisalt" means that the electrolyte comprises at least two salts.

In some embodiments, the electrolyte comprises:

(a) at least one metal salt;

(b) at least one solvent comprising between about 1% and about 100% water by weight of the solvent; and (c) at least one polymer.

In some embodiments the volume percent of water in the aqueous electrolyte relative to the total liquid solvent volume is greater than 5%, 10%, 20%, 30%, 40%, 50%, 60%, 70%, 80%, or 90%. In some embodiments, water is the only liquid solvent in the electrolyte (i.e., water constitutes 100% of the solvent volume of the electrolyte).

In some embodiments, the electrolyte is a hybrid electrolyte. In some embodiments, the hybrid electrolyte further comprises one or more non-aqueous solvents. In some embodiments, the volume percent of non-aqueous solvents in the hybrid electrolyte is between about 1% and about 10%, about 10% and about 20%, about 20% and about 30%, about 30% and about 40%, about 40% and about 50%, about 50% and about 60%, about 60% and about 70%, about 70% and about 80%, or about 80% and about 90%. In some embodiments, the non-aqueous solvent is a aprotic, protic organic solvents (solids and liquids, typically liquids or solid polyethylene oxide), or ionic liquid. In some embodiments, the non-aqueous solvent is a protic organic solvent.

In some embodiments, the aqueous electrolyte comprises 1, 2, 3, 4, 5, 6, 7, or 8 metal salts. In some embodiments, the aqueous electrolyte comprises 1 metal salt. In some embodiments, the aqueous electrolyte comprises 2 metal salts.

In some embodiments, the at least one metal salt comprises a metal ion and an anion. In some embodiments, the metal salt comprises a positive metal ion and a counter anion that are stable against hydrolysis. In some embodiments, the metal salt comprises a metal ion and a counter anion that are stable against electrochemical oxidation and reduction. In some embodiments, the metal salt comprises a metal ion and a counter ion that are passivated by electrochemical oxidation and reduction.

In some embodiments, the metal ion is selected from the group consisting of $Li^+$, $Na^+$, $K^+$, $Mg^{2+}$, and $Al^{3+}$. In some embodiments, the metal ion is $Li^+$. In some embodiments, the metal ion is $Na^+$. In some embodiments, the metal ion is $K^+$. In some embodiments, the metal ion is $Mg^{2+}$. In some embodiments, the metal ion is $Al^{3+}$.

In some embodiments, the anion is chemically stable against hydrolysis. As used herein, the term "chemically stable" means that the anion is thermodynamically stable, which occurs when a system is in its lowest energy state or is in chemical equilibrium with its environment.

In some embodiments, the anion is selected from the group consisting of bis(trifluoromethane sulfonyl)imide (TFSI), trifluoromethane sulfonate (OTf), bis(fluorosulfonyl)imide (FSI), tetrafluorophosphate ($BF_4$), hexafluorophosphate ($PF_6$), bis(pentafluoroethane sulfonyl) imide (BETI), 4,5-dicyano-2-trifluoromethanoimidazole (DCMI), [fluoro(nonafluorobutane) sulfonyl]imide (FNF), perchlorate ($ClO_4$), sulfate ($SO_4$), and nitrate ($NO_3$).

In some embodiments, the at least one metal salt is selected from the group consisting of LiTFSI, LiOTf, LiFSI, $LiBF_4$, $LiPF_6$, LiBETI, LiDCMI, LiFNF, $LiClO_4$, $LiSO_4$, $LiNO_3$, NaTFSI, NaOTf, NaFSI, NaBETI, NaDCMI, NaFNF, $NaClO_4$, $NaSO_4$, $NaNO_3$, KTFSI, KOTf, KFSI, KBETI, KDCMI, KFNF, $KClO_4$, $KSO_4$, $KNO_3$, $Mg(TFSI)_2$, $Mg(OTf)_2$, $Mg(FSI)_2$, $Mg(BETI)_2$, $Mg(DCMI)_2$, $Mg(FNF)_2$, $Mg(ClO_4)_2$, $Mg(SO_4)_2$, $Mg(NO_3)_2$, $Al(TFSI)_3$, $Al(OTf)_3$, $Al(FSI)_3$, $Al(BETI)_3$, $Al(DCMI)_3$, $Al(FNF)_3$, $Al(ClO_4)_3$, $Al(SO_4)_3$, and $Al(NO_3)_3$. In some embodiments, the metal salt is selected from the group consisting of LiTFSI, LiOTf, NaTFSI, NaOTf, KTFSI, KBETI, and $Mg(TFSI)_2$.

In some embodiments, the at least one metal salt is a lithium salt. In some embodiments, the at least one metal salt is a lithium salt selected from the group consisting of LiTFSI, LiOTf, LiFSI, $LiBF_4$, $LiPF_6$, LiBETI, LiDCMI, LiFNF, $LiClO_4$, $LiSO_4$, and $LiNO_3$. In some embodiments, the at least one metal salt is LiTFSI. In some embodiments, the at least one metal salt is a mixture of LiOTf and LiTFSI.

In some embodiments, the molal concentration (mol/kg) of the metal salt in the aqueous electrolyte is between about 0.1 and about 100, about 0.1 and about 50, about 0.1 and about 25, about 0.1 and about 22, about 0.1 and about 21, about 0.1 and about 20, about 0.1 and about 15, about 0.1 and about 10, about 0.1 and about 5, about 0.1 and about 1, about 1 and about 100, about 1 and about 50, about 1 and about 25, about 1 and about 22, about 1 and about 21, about 1 and about 20, about 1 and about 15, about 1 and about 10, about 1 and about 5, about 5 and about 100, about 5 and about 50, about 5 and about 25, about 5 and about 22, about 5 and about 21, about 5 and about 20, about 5 and about 15, about 5 and about 10, about 10 and about 100, about 10 and about 50, about 10 and about 25, about 10 and about 22, about 10 and about 21, about 10 and about 20, about 10 and about 15, about 15 and about 100, about 15 and about 50, about 15 and about 25, about 15 and about 22, about 15 and about 21, about 15 and about 20, about 20 and about 100, about 20 and about 50, about 20 and about 25, about 20 and about 22, about 20 and about 21, about 21 and about 100, about 21 and about 50, about 21 and about 25, about 21 and about 22, about 22 and about 100, about 22 and about 50, about 22 and about 25, about 25 and about 100, about 25 and about 50, or about 50 and about 100. In some embodiments, the molal concentration of the metal salt in the aqueous electrolyte is between about 0.1 and about 25. In some embodiments the molal concentration of the metal salt in the aqueous electrolyte is between about 5 and 100.

In some embodiments, the at least one metal salt and solvent are combined at a temperature of between about 0° C. and about 100° C., about 0° C. and about 80° C., about 0° C. and about 60° C., about 0° C. and about 40° C., about 0° C. and about 20° C., about 20° C. and about 100° C., about 20° C. and about 80° C., about 20° C. and about 60° C., about 20° C. and about 40° C., about 40° C. and about 100° C., about 40° C. and about 80° C., about 40° C. and about 60° C., about 40° C. and about 100° C., about 40° C. and about 80° C., about 40° C. and about 60° C., about 60° C. and about 100° C., about 60° C. and about 80° C., or between about 80° C. and about 100° C. In some embodiments, the at least one metal salt is added to solvent at a temperature of between about 20° C. and about 40° C.

In some embodiments, the aqueous electrolyte comprises 1, 2, 3, 4, 5, 6, 7, or 8 polymers. In some embodiments, the aqueous electrolyte comprises 1 polymer. In some embodiments, the aqueous electrolyte comprises 2 polymers.

In some embodiments, the at least one polymer is a hydrophilic polymer.

In some embodiments, the at least one polymer is selected from the group consisting of an acrylic, an amine, an amide, an imide, an ester, an ether, an olefin, a styrene, a vinyl acetal, a vinyl, a vinylidene chloride, a vinyl ester, a vinyl ether, a vinyl pyridine, and a vinyl pyrrolidone. In some embodiments, the at least one polymer is selected from the group consisting of a poly(N-isopropylacrylamide), a polyacrylamide, a poly(2-oxazoline), a polyethyleneimine, a poly(acrylic acid), a polymethacrylate, a poly(ethylene glycol), a poly(ethylene oxide), a poly(vinyl alcohol), and a poly(vinylpyrrolidine). In some embodiments, the at least one polymer is poly(vinyl alcohol).

In some embodiments, the at least one polymer is a poly(N-isopropylacrylamide) with an average molecular weight between about 10,000 and about 40,000 Da. Examples of poly(N-isopropylacrylamide) include poly(N-isopropylacrylamide) available from Sigma-Aldrich with an average molecular weight of about 10,000 Da, about 30,000 Da, and about 40,000 Da.

In some embodiments, the at least one polymer is polyacrylamide with an average molecular weight of 150,000 available from Sigma-Aldrich.

In some embodiments, the at least one polymer is a poly(2-ethyl-2-oxazoline) with an average molecular weight between about 5,000 and about 25,000. Examples of poly (2-ethyl-2-oxazoline) include poly(2-ethyl-2-oxazoline)

available from Sigma-Aldrich with an average molecular weight of about 5,000 Da, about 10,000 Da, and about 25,000 Da.

In some embodiments, the at least one polymer is a poly(ethylene glycol) with an average molecular weight between about 200 and about 20,000 Da. Examples of poly(ethylene glycol) include PEG-200 (average molecular weight of 200 Da), PEG-300 (average molecular weight of 300 Da), PEG-400 (average molecular weight of 400 Da) (all manufactured by Sanyo Chemical Industries, Ltd.), PEG #200 (average molecular weight of 200 Da), PEG #300 (average molecular weight of 300 Da), PEG #400 (average molecular weight of 400 Da) (all manufactured by Lion Corporation), PEG #200 (average molecular weight of 200 Da), PEG #300 (average molecular weight of 300), PEG #400 (average molecular weight of 400 Da) (all manufactured by NOF CORPORATION), PEG200 (average molecular weight of 200 Da), PEG300 (average molecular weight of 300 Da), and PEG400 (average molecular weight of 400 Da) (all manufactured by Dai-chi Kogyo Seiyaku Co., Ltd.).

In some embodiments, the at least one polymer is poly(vinyl alcohol) with an average molecular weight between about 500 and about 130,000 Da. Examples of poly(vinyl alcohol) include poly(vinyl alcohol) available from Sigma-Aldrich with an average molecular weight of 89,000-98,000 Da, 31,000-50,000 Da, 85,000-124,000 Da, 13,000-23,000 Da, or 9,000-10,000 Da.

In some embodiments, the at least one polymer is a poly(ethylene oxide) with an average molecular weight between about 100,000 and about 1,000,000 Da. Examples of poly(ethylene oxide) include poly(ethylene oxide) available from Sigma-Aldrich with an average molecular weight of 100,000 Da, 200,000 Da, 300,000 Da, 400,000 Da, or 600,000 Da.

In some embodiments, the weight ratio of the at least one polymer in the electrolyte is between about 1% and about 99%, about 1% and about 90%, about 1% and about 80%, about 1% and about 70%, about 1% and about 60%, about 1% and about 50%, about 1% and about 40%, about 1% and about 30%, about 1% and about 20%, about 1% and about 10%, about 10% and about 99%, about 10% and about 90%, about 10% and about 80%, about 10% and about 70%, about 10% and about 60%, about 10% and about 50%, about 10% and about 40%, about 10% and about 30%, about 10% and about 20%, about 20% and about 99%, about 20% and about 90%, about 20% and about 80%, about 20% and about 70%, about 20% and about 60%, about 20% and about 50%, about 20% and about 40%, about 20% and about 30%, about 30% and about 99%, about 30% and about 90%, about 30% and about 80%, about 30% and about 70%, about 30% and about 60%, about 30% and about 50%, about 30% and about 40%, about 40% and about 99%, about 40% and about 90%, about 40% and about 80%, about 40% and about 70%, about 40% and about 60%, about 40% and about 50%, about 50% and about 99%, about 50% and about 90%, about 50% and about 80%, about 50% and about 70%, about 50% and about 60%, about 60% and about 99%, about 60% and about 90%, about 60% and about 80%, about 60% and about 70%, about 70% and about 99%, about 70% and about 90%, about 70% and about 80%, about 80% and about 99%, about 80% and about 90%, and about 90% and about 99%. In some embodiments, the weight ratio of the at least one polymer in the electrolyte is between about 1% to about 20%.

In some embodiments, after combining the at least one polymer with the at least one metal salt and solvent, the combination is mixed at a temperature of between about 0° C. and about 150° C., about 0° C. and about 100° C., about 0° C. and about 80° C., about 0° C. and about 60° C., about 0° C. and about 40° C., about 40° C. and about 150° C., about 40° C. and about 100° C., about 40° C. and about 80° C., about 40° C. and about 60° C., about 60° C. and about 150° C., about 60° C. and about 100° C., about 60° C. and about 80° C., about 80° C. and about 150° C., about 80° C. and about 100° C., or between about 100° C. and about 150° C. In some embodiments, the at least one polymer is added to the at least one metal salt and solvent at a temperature of between about 80° C. and about 100° C.

In some embodiments, after combining the at least one polymer with the at least one metal salt and solvent, the combination is mixed for a time between about 20 minutes and about 10 hours, about 20 minutes and about 8 hours, about 20 minutes and about 6 hours, about 20 minutes and about 4 hours, about 20 minutes and about 2 hours, about 20 minutes and about 1 hour, about 1 hour and about 10 hours, about 1 hour and about 8 hours, about 1 hour and about 6 hours, about 1 hour and about 4 hours, about 1 hour and about 2 hours, about 2 hours and about 10 hours, about 2 hours and about 8 hours, about 2 hours and about 6 hours, about 2 hours and about 4 hours, about 4 hours and about 10 hours, about 4 hours and about 8 hours, about 4 hours and about 6 hours, about 6 hours and about 10 hours, about 6 hours and about 8 hours, about 8 hours and about 10 hours. In some embodiments, after combining the at least one polymer with the at least one metal salt and solvent, the combination is mixed for a time between about 4 hours and about 6 hours.

Anode

The anode (positive electrode) used in the electrochemical cell can be any suitable anode. In some embodiments, the anode (positive electrode) of the electrochemical cell comprises a metal selected from the group consisting of lithium, magnesium, molybdenum, aluminum, zinc, chromium, iron, nickel, tin, lead, copper, silver, palladium, mercury, platinum, gold, sulfur, selenium, and combinations thereof; metal alloys; metal oxides; graphite or another carbon of varying degrees of graphitization; phosphates; and sulfides. In some embodiments, the anode is $Mo_6S_8$, a sulfur carbon composite, $LiVPO_4F$, $Li_4Ti_5O_{12}$, or $TiO_2$. In some embodiments, the anode is S-KB.

Cathode

In some embodiments, the cathode (negative electrode) comprises a metal selected from the group consisting of ferrate, iron oxide, cuprous oxide, iodate, cupric oxide, mercuric oxide, cobaltic oxide, manganese dioxide, lead oxide, oxygen, lithium oxide, nickel oxyhydroxide, nickel dioxide, silver peroxide, permanganate, and bromate.

In some embodiments, the cathode is a lithium metal oxide. In some embodiments, the cathode is a lithium metal phosphate. A lithium metal oxide or lithium metal phosphate is a composite of lithium oxide or lithium phosphate with a transition metal. In some embodiments, the cathode is a lithium metal oxide comprising Ni, Co, Mn, Fe, or V as the transition metal. In some embodiments, the cathode is a lithium metal phosphate comprising Ni, Co, Mn, Fe, or V as the transition metal. In some embodiments, the cathode is a lithium metal oxide comprising Ni, Co, Mn, or V as the transition metal. In some embodiments, the cathode is a lithium metal oxide comprising Ni, Co, Mn, or V as the transition metal.

In some embodiments, the cathode is selected from the group consisting of $LiCoO_2$, $LiNi_{0.33}Mn_{0.33}Co_{0.33}O_2$, $LiNi_{0.5}Mn_{1.5}O_2$, $LiCoPO_4$, $LiNiPO_4$, $LiVPO_4F$, metal oxides, metal phosphates, conversion-reaction materials based on metal oxides, metal halides, and metal sulfides. In some embodiments, the cathode is selected from the group consisting of $LiFePO_4$, $LiMn_2O_4$, $LiCoO_2$, $LiVPO_4F$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, and $LiMnPO_4$. In some embodiments, the cathode is $LiCoO_2$.

In some embodiments, the cathode further comprises a cathode conductive aid, a carbon particle, a binder, or combinations thereof.

Electrochemical Devices

In some embodiments, electrochemical devices that operate using oxidative additives are fabricated using techniques known to those of ordinary skill in the art. In some embodiments, the electrochemical device is a battery.

Batteries are divided into two principal types, primary batteries and secondary batteries. Primary batteries are used once and are then exhausted. Secondary batteries are also often called rechargeable batteries because, after use, they may be recharged, then used again. In rechargeable batteries, each charge/discharge process is called a cycle. Rechargeable batteries eventually reach an end of their usable life, but typically only after many charge/discharge cycles.

A rechargeable battery includes an electrochemical cell and optionally other materials, such as a casing to protect the cell and wires or other connectors to allow the battery to interface with the outside world.

The cation that is transported between the electrodes by the electrolyte is called the "working ion." A rechargeable battery is named after the working cation. For example, the positive ion in a lithium secondary battery is the lithium ion ($Li^+$). In a sodium secondary battery it is the sodium ion ($Na^+$).

To recharge the battery, electrons flow from the cathode to the anode by the application of electric power. By supplying electric energy to the battery, electrons are induced to leave the cathode and enter the anode. To keep the overall charge neutral in the cathode and anode, a positive ion leaves the cathode and enters the electrolyte, and a positive ion also leaves the electrolyte and enters the anode. The efficiency of electrical-energy storage in a rechargeable battery depends on the reversibility of the chemical reaction between the two electrodes.

Because the ionic conductivity in the electrolyte is many times smaller than the electronic conductivity in the electrode, a battery has large-area electrodes that are separated by a thin electrolyte. Therefore, the electrodes do not need to be thick, and, their electronic conductivity does not need to be high so long as they make contact with a metallic current collector. Consequently, in addition to containing an active material that exchanges electrons and ions, anodes and cathodes may contain other materials in addition to a metal backing to which a slurry of the active material is applied and dried. The slurry often contains, in addition to the active material, a binder to help it adhere to the backing and conductive materials, such as carbon particles. Once the slurry dries, it forms a coating on the metal backing.

The present disclosure also provides methods of manufacture of the aqueous electrolyte battery. In some embodiments, the method involves de-oxygenating the electrolyte and forming and sealing the cell in an inert or reducing environment devoid of molecular oxygen (e.g., a nitrogen environment) in order to reduce or eliminate free oxygen in the electrolyte solution. In this way the irreversible oxidation in the aqueous electrolyte and the resultant loss of material, is avoided.

In some embodiments, the cells are self-contained and sealed in a hermetic casing wherein the entirety of the cell is derived from and disposed in the casing during cell manufacture. These fully sealed cells may be secondary cells. In some embodiments, the casing comprises one layer. In some embodiments, the casing comprises more than one layer. In some embodiments, the casing comprises at least one layer selected from a polyethylene terephthalate layer, a polymer layer, and a propylene layer. In some embodiments, the casing comprises at least one carbonized plastic layer.

In some embodiments, the cells are configured in a battery flow cell system, wherein the aqueous electrolyte is caused to flow and/or circulate into the cell. In some embodiments, the aqueous or hybrid electrolyte is caused to flow and/or circulate through an inter-electrode region between the anode and the cathode. In some embodiments, the electrolyte in the anode and the cathode are flowable and during operation are caused to flow through the cell.

In some embodiments, the aqueous electrolyte battery can be of any shape, such as coin-shaped, button-shaped, sheet-shaped, layered, cylindrical, flat, or square. In some embodiments, the aqueous or hybrid secondary battery can be applied to large objects, such as electric vehicles.

In some embodiments, the aqueous electrolyte battery is a secondary battery. In some embodiments, the secondary battery can include a single electrochemical cell or multiple electrochemical cells. Batteries with more than one cell may contain components to connect or regulate the multiple electrochemical cells.

Several important properties of rechargeable batteries include energy density, power density, capacity, particularly reversible capacity, rate capability, cycle life, thermal stability, cost, and safety. All of these properties are influenced by the choice of materials used to form the battery. The capacity of a battery is the amount of electronic charge that is transported at a constant current between the electrodes per unit weigh in the time $A_t$ for a complete discharge, and the energy density is the product of the average voltage during discharge and the capacity. Both decrease with increasing current and, therefore, power delivered. Moreover, the cycle life of a rechargeable battery is defined as the number of charge/discharge cycles before the capacity fades to 80% of its original capacity. Capacity fade is caused by a loss of the reversibility of the chemical reaction between the electrodes.

In some embodiments, battery performance can be quantified with four parameters: cell voltage, capacity, Coulombic efficiency, and cycling stability. While the first two determine the energy density, the latter two dictate the life and energy efficiency.

The "energy density" of a battery is the nominal battery energy per unit mass (Wh/kg). The energy density is the ability of a battery to store energy, i.e., a high energy density can store a lot of energy than a low energy density battery.

In some embodiments, the energy density for the battery at a C-rate of 0.2 C is between about 20 Wh/kg and about 200 Wh/kg, about 20 Wh/kg and about 150 Wh/kg, about 20 Wh/kg and about 120 Wh/kg, about 20 Wh/kg and about 90 Wh/kg, about 20 Wh/kg and about 60 Wh/kg, about 60 Wh/kg and about 200 Wh/kg, about 60 Wh/kg and about 150 Wh/kg, about 60 Wh/kg and about 120 Wh/kg, about 60 Wh/kg and about 90 Wh/kg, about 90 Wh/kg and about 200

Wh/kg, about 90 Wh/kg and about 150 Wh/kg, about 90 Wh/kg and about 120 Wh/kg, 120 Wh/kg and about 200 Wh/kg, about 120 Wh/kg and about 150 Wh/kg, or about 150 Wh/kg and about 200 Wh/kg. In some embodiments, the energy density for the battery at a C-rate of 0.5 C is between about 120 Wh/kg and about 150 Wh/kg.

In some embodiments, the energy density for the battery at a C-rate of 0.1 C is between about 20 Wh/kg and about 200 Wh/kg, about 20 Wh/kg and about 150 Wh/kg, about 20 Wh/kg and about 120 Wh/kg, about 20 Wh/kg and about 90 Wh/kg, about 20 Wh/kg and about 60 Wh/kg, about 60 Wh/kg and about 200 Wh/kg, about 60 Wh/kg and about 150 Wh/kg, about 60 Wh/kg and about 120 Wh/kg, about 60 Wh/kg and about 90 Wh/kg, about 90 Wh/kg and about 200 Wh/kg, about 90 Wh/kg and about 150 Wh/kg, about 90 Wh/kg and about 120 Wh/kg, 120 Wh/kg and about 200 Wh/kg, about 120 Wh/kg and about 150 Wh/kg, or about 150 Wh/kg and about 200 Wh/kg. In some embodiments, the energy density for the battery at a C-rate of 0.1 C is between about 20 Wh/kg and about 90 Wh/kg.

The "cycle life" of a battery is the number of complete charge/discharge cycles that the battery is able to support before its capacity falls under 80% of its original capacity. The "C-rate" of a battery is a measure of the rate at which a battery is being discharged. A C-rate of 1 C is a one-hour discharge, a C-rate of 0.5 C is a two-hour discharge, and a C-rate of 0.2 C is a five-hour discharge.

In some embodiments, the number of cycles for the battery at a C-rate of about 2.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a C-rate of about 2.5 C is between about 10 and about 500.

The "capacity retention" of a battery is a measurement of the fraction of full capacity available from a battery under a specified set of conditions, after the battery has been stored for a given amount of time.

In some embodiments, the capacity decay rate (in mAh/g) for a battery at a C-rate of about 1.0 C is between about 0.005% and about 0.1%, about 0.005% and about 0.05%, 0.005% and about 0.01%, about 0.01% and about 0.1%, about 0.01% and about 0.05%, or about 0.05% and about 0.01% per cycle. In some embodiments, the capacity decay rate (in mAh/g) for a battery at a C-rate of about 1.0 C is between about 0.05% and about 0.01% per cycle.

In some embodiments, the capacity retention (in mAh/g) for a battery at a C-rate of about 0.5 C is between about 30% and about 100%, about 30% and about 90%, about 30% and about 80%, about 30% and about 70%, about 30% and about 60%, about 60% and about 100%, about 60% and about 90%, about 60% and about 80%, about 60% and about 70%, about 70% and about 100%, about 70% and about 90%, about 70% and about 80%, about 80% and about 100%, about 80% and about 90%, or about 90% and about 100%. In some embodiments, the capacity retention (in mAh/g) for a battery at a C-rate of about 0.5 C is between about 80% and about 100%.

In some embodiments, the number of cycles for the battery at a C-rate of about 2.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a C-rate of about 2.5 C is between about 500 and about 2000.

In some embodiments, the electrochemical cell operates at a temperature of less than about 100° C., about 90° C., about 80° C., about 70° C., about 60° C., about 50° C., about 40° C., about 30° C., about 20° C., or about 10° C. In some embodiments, the electrochemical cell operates at a temperature between about −40° C. and about 100° C., about −40° C. and about 90° C., about −40° C. and about 80° C., about −40° C. and about 70° C., about −40° C. and about 60° C., about -40° C. and about 50° C., about −40° C. and about 40° C., about −40° C. and about 30° C., about −30° C. and about 100° C., about −30° C. and about 90° C., about −30° C. and about 80° C., about −30° C. and about 70° C., about −30° C. and about 60° C., about −30° C. and about 50° C., about −30° C. and about 40° C., about −30° C. and about 30° C., about −20° C. and about 100° C., about −20° C. and about 90° C., about −20° C. and about 80° C., about −20° C. and about 70° C., about −20° C. and about 60° C., about −20° C. and about 50° C., about −20° C. and about 40° C., or about −20° C. and about 30° C.

In some embodiments, the electrochemical cell has a fuel cell output voltage greater than 1.5 V, 1.6 V, 1.7 V, 1.8 V, 1.9 V, or 2.0 V. In some embodiments, the electrochemical cell has a fuel cell output voltage between 1.0 V and 5.0 V, 1.0 V and 3.5 V, 1.0 V and 3.0 V, 1.0 V and 2.5 V, 1.0 V and 2.0 V, 1.0 V and 1.5 V, 1.5 V and 5.0 V, 1.5 V and 3.5 V, 1.5 V and 3.0 V, 1.5 V and 2.5 V, 1.5 V and 2.0 V, 2.0 V and 5.0 V, 2.0 V and 3.5 V, 2.0 V and 3.0 V, 2.0 V and 2.5 V, 2.5 V and 5.0 V, 2.5 V and 3.5 V, or 2.5 V and 3.0 V.

The following examples are illustrative and non-limiting of the electrochemical cells, methods of making, and methods of using described herein. Suitable modifications and adaptations of the variety of conditions, formulations and other parameters normally encountered in the field and which are obvious to those skilled in the art in view of this disclosure are within the spirit and scope of the invention.

EXAMPLES

Example 1

Preparation of Electrodes and Electrolyte

A sulfur-Ketjenblack (S-KB) composite was obtained by homogenously mixing sulfur powder (99.99%, Sigma-Aldrich) and Ketjenblack carbon black (KB, AkzoNobel) with simple heat treatment (155° C.), which incorporates sulfur into the porous matrix by melt diffusion. The mass ratio of S to KB is 5:4. Composite S-KB anodes were fabricated by compressing S-KB composite and poly(vinylidenedifluoride) (PTFE) at a weight ratio of 9:1 on an aluminum mesh (200 mesh). Composite $LiMn_2O_4$ and $LiCoO_2$ cathodes were fabricated by compressing active material powder (MTI Corporation), carbon black, and PTFE at weight ratio of 8:1:1 on a stainless steel grid. The aqueous electrolytes were prepared by dissolving 21 m (mol-salt in kg-solvent) LiTFSI (>98%, TCI Co., Ltd.) in water (HPLC grade), in which an additional 7 m LiOTf (>99.996%, Sigma-Aldrich) was dissolved to make the water-in-bisalt electrolyte. The aqueous gel electrolytes were prepared by adding 10 weight % polyvinyl alcohol (PVA, Sigma-Aldrich) to the liquid water-in-bisalt electrolyte followed by heating at 95° C. for 5 hours under vigorous stirring. Prior to the assembling, electrodes and the separator were soaked with the hot gel and then allowed to solidify at room temperature for 10 hours.

Example 2

Electrochemical Measurements

The three-electrode devices for both anode and cathode materials consist of the test material as the working electrode, active carbon (about 20 times mass of working) as the counter electrode, and Ag/AgCl as the reference electrode. Cyclic voltammetry (CV) was carried out using CHI 600E electrochemical workstation. The Li-ion/S-KB full cell was assembled in a CR2032-type coin cell using either $LiMn_2O_4$ or $LiCoO_2$ as cathode, S-KB as anode, and glass fiber as separator. The cells were cycled galvanostatically on a Land BT2000 battery test system (Wuhan, China) at room-temperature. The reference non-aqueous Li/S-KB full cells were assembled in a CR2032-type coin cell using the same S-KB electrode as cathode, lithium foil as anode, and a typical electrolyte comprised of 1 M LiTFSI in 1:1 1,2-dimethoxy-ethane/1,3-dioxolane (DME/DOL; vol %), and 2 wt % $LiNO_3$. A Galvanostatic Intermittent Titration Technique (GITT) experiment was performed in a two-electrode full cell with the capacity of $LiMn_2O_4$ cathode in a five-time excess to the anode in order to avoid the interference from its two plateaus. The cycling protocol consisted of 0.1 C current pulses for 10 minutes alternated with 60 minute open circuit voltage (OCV) periods.

Example 3

Characterization

In-situ Raman spectra were collected with a Labram Aramis (HORIBA Jobin Yvon, New Jersey, USA) using a HeNe laser (632.8 nm) between 700 and 60 cm$^{-1}$, with a $LiMn_2O_4$/S-KB full cell assembled in a well-sealed quartz tube and hooked with a galvanostatical battery test system.

Ex-situ X-ray photoelectron spectroscopic (XPS) analysis was performed on a high resolution AXIS 165 X-ray photoelectron spectrometer (Kratos Analytical Ltd., Wharfside, Manchester) using monochromic Al Ka radiation. Ex-situ scanning electron microscopy (SEM) of the anode was performed in a Hitachi S-4700 (Hitachi, Schaumburg, Ill.) operating at 5 kV. The tested S-KB anodes were retrieved from the full cells at different states of charge for the third charge process, then soaked in DME for 1 minute to remove most of the electrolyte residual.

Example 4

Figure 1:
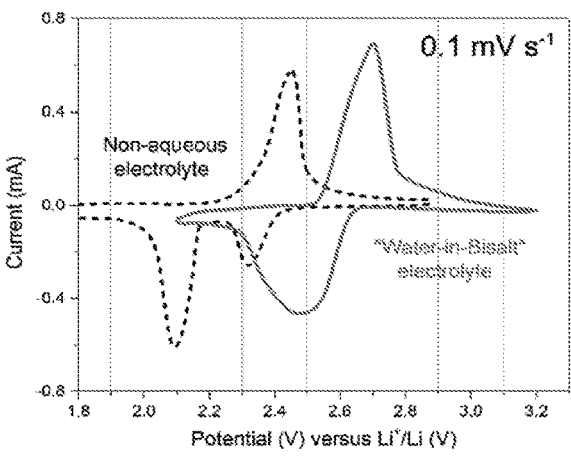
FIG. 1 is a cyclic voltammogram of a sulfur-Ketjenblack (S-KB) composite at 0.1 mV/s in an aqueous electrolyte (solid line) and in a non-aqueous electrolyte (dashed line).
Figure 2:
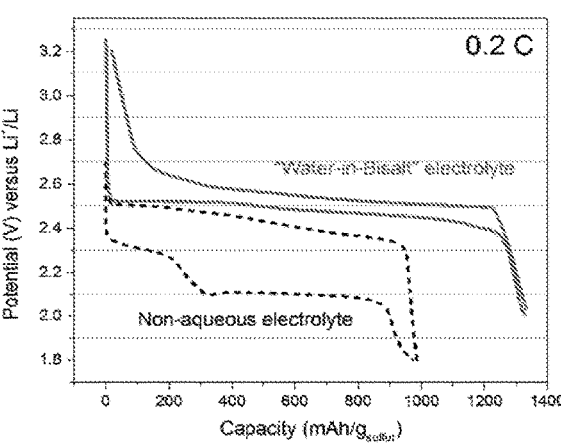
FIG. 2 is a voltage profile of a S-KB composite at 0.1 mV/s in an aqueous electrolyte (solid line) and in a non-aqueous electrolyte (dashed line). Data for the aqueous electrolyte was collected in a three-electrode device with S-KB composite as a working electrode, Ag/AgCl as a reference electrode, and a water-in-bisalt (21 m LiTFSI and 7 m LiOTf) solution as electrolyte. Data for the nonaqueous electrolyte was collected in a two-electrode cell with S-KB composite as cathode, metallic lithium as anode, and an electrolyte solution (1 M LiTFSI in 1:1 1,2-diemethoxy-ethane:1,3-dioxolane and 2 wt % $LiNO_3$). The potential was converted into a scale against the Li reference for convenience of comparison.

Electrochemical behavior of a sulfur-carbon composite electrode (S-KB) in a water-in-bisalt electrolyte and in a typical organic electrolyte was investigated using cyclic voltammetry. The aqueous electrolyte, obtained by dissolving a eutectic mixture of the Li salts LiTFSI and LiOTf at extremely high concentrations (LiTFSI=21 m and LiOTf=7 m) at 25° C. in water, provided an expanded stability window, due to the formation of a dense and protective solid-electrolyte interphase (SEI) (Suo, L., et al., *Angewandte Chemie International Edition* 55, 7136-7141 (2016)). A reversible lithiation/de-lithiation reaction of sulfur in this 28 m electrolyte was observed at 2.46 V and 2.65 V, respectively (see FIG. 1). Although the potential for hydrogen evolution at pH=7.0 is ~2.63 V vs. Li, the SEI suppresses the reduction of water molecules down to a potential of ~1.9 V; thus, making the reversible lithiation/de-lithiation reaction possible. Upon closer comparison with the well-known redox process of sulfur in non-aqueous media between 2.1 V-2.4 V (dashed line) (Jayaprakash, N., et al., *Angew Chem Int Ed Engl* 50, 5904-5908 (2011)), an apparent positive shift of ~0.3 V occurred in the aqueous solution, along with a drastic change from the characteristic two-stage lithiation process in non-aqueous media to a seemingly single stage redox process in aqueous media, and a much reduced potential "hysteresis" in the latter. Such changes are more visually obvious in the corresponding voltage profiles obtained in a galvanostatic manner (FIG. 2), where a singular, well-defined plateau at ~2.5 V represents the discharge/charge of the sulfur-Ketjenblack composition in the water-in-bisalt electrolyte, significantly differing from the two plateaus shown at ~2.3 V and 2.1 V in non-aqueous electrolyte (Pang, Q., et al., *Nat Commun* 5, 4759 (2014)).

Figure 3:
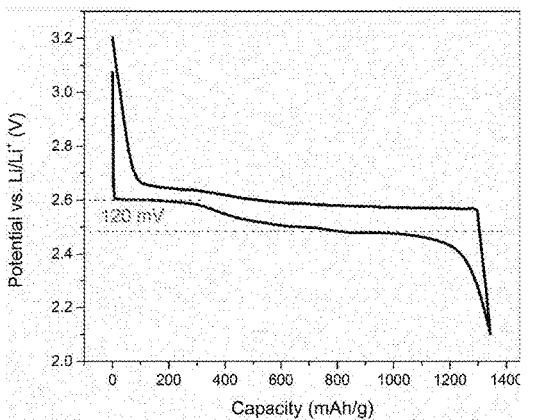
FIG. 3 is a voltage profile of a S-KB anode at constant current (0.2 C) in 21 m LiTFSI solution as aqueous electrolyte, collected in a three-electrode device with S-KB composite as working electrode and Ag/AgCl as a reference electrode.

While the above positive shift in potential is attributed to the high Li salt concentration in the water-in-bisalt electrolyte observed previously (Suo, L., et al., *Science* 350, 938-943 (2015)), the difference between aqueous and non-aqueous voltage profiles seems to originate from a different reaction mechanism. The typical two-plateau discharge curve obtained in non-aqueous media has been attributed to the solid to liquid (sulfur to high-order polysulfide) reaction (Yamin, H., et al., *J Electrochem Soc* 135, 1045-1048 (1988)), and to the liquid to solid (high-order polysulfides to low-order sulfide solid) reaction (X. Ji and L. F. Nazar, *J Mater Chem* 20, 9821 (2010) and Y. V. Mikhaylik and J. R. Akridge, *J Electrochem Soc* 151, A1969-A1976 (2004)). The single-stage discharge plateau in a water-in-salt electrolyte suggested that the redox processes of sulfur might undergo a single solid-to-liquid reaction in a homogeneous phase, which is associated with ultrafast kinetics. As a result, a reversible capacity of 1,327 mAh/g was achieved based on sulfur mass at a current density of 335 mA/g (0.2 C), which is ~79% of the theoretical capacity (1,675 mAh/g) and comparable with the best results achieved in non-aqueous electrolyte (Ji, X., et al., *Nat Mater* 8, 500-506 (2009)). Using a water-in-salt electrolyte (21 m LiTFSI in water, FIG. 3) as a control, the discharge/charge voltage profiles exhibited two plateaus with a gap of ~120 mV, revealing that the homogeneous phase reaction relies on the higher concentration of lithium salts (or lower content of water) in the water-in-bisalt electrolyte.

Figure 4:
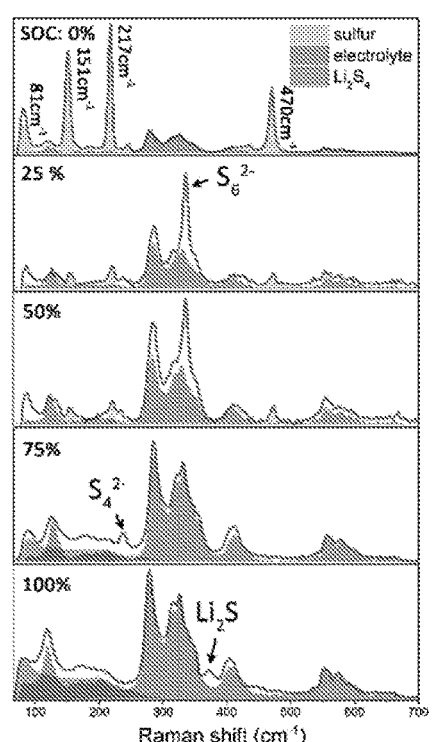
FIG. 4 are in-situ Raman spectra of the S-KB anode in a full cell after being charged to specific states of charge.

To fully understand the mechanism of the sulfur-lithium reaction and polysulfide formation in water-in-salt electrolyte, in-situ Raman spectroscopy was used to monitor the transformation of polysulfide species in the S-KB anode at different states of charge (SOC) during the third charge process of a S-KB/$LiMn_2O_4$ full cell (FIG. 4). The fully discharged (de-lithiated) S-KB anode (SOC=0%, corresponding to the fully charged state of sulfur when used as cathode in non-aqueous electrolyte) showed conspicuous peaks corresponding to elemental sulfur ($\alpha$-$S_8$) at 81, 151, 217, and 470 cm$^{-1}$ (Peon, J.-T., et al., *J Electrochem Soc* 159, A1308-A1314 (2012)). Based on the normalized intensity ratio the estimated amount of $\alpha$-$S_8$ exponentially declined to nearly zero before the SOC reached 25%, suggesting a rapid and full consumption of $S_8$ by lithiation (FIG. 6). A sharp peak at 339 cm$^{-1}$, which is assigned to long-chain polysulfide species $S_6^{2-}$ (Janz, G. J., et al., *Inorg Chem* 15, 1755-1759 (1976) and Smith, L. C., et al., *Mater Horiz* 3, 137-144 (2016)) appeared at SOC=25%, but disappeared after SOC=75%. Meanwhile, a small peak at 234 cm$^{-1}$, which is attributed to the bending mode of $S_4^{2-}$, gradually grew after SOC=25% during charge (Wu, H. L., et al., *ACS Appl Mater Interfaces* 7, 1709-1719 (2015)). At the final stage of charge (SOC=100%), a $Li_2S$ peak located at 371 cm$^{-1}$ appeared. These results clearly show the gradual procession from elemental sulfur to long-chain polysulfides and then to the fully lithiated form $Li_2S$ ($S_8$→long chain $Li_2S_x$→short chain $Li_2S_x$→$Li_2S$), similar to the reduction process of sulfur in non-aqueous media. The difference between the two was that in aqueous media, obvious lift-up in the range of 65-300 cm$^{-1}$ with a peak at 80 cm$^{-1}$ was observed in the states of charge 50%. To investigate the nature of these peaks, the Raman spectra of element sulfur powder, pure $Li_2S$ powder, $Li_2S_4$ in aqueous solution, and the water-in-bisalt electrolyte were analyzed as the references (FIG. 8), and the peaks in the range of 65-300 cm$^{-1}$ with a peak at 80 cm$^{-1}$for the S-KB anode were well fitted to the Raman spectra of water-solvated polysulfide mixture ($Li_2S_4$). Therefore, the formed $Li_2S_4$ takes $H_2O$ from the water-in-bisalt electrolyte to form a $Li_2S_4$-anolyte, which is immiscible with the water-in-bisalt electrolyte (FIG. 7). In diluted aqueous solutions, the long-chain species $Li_2S_x$ (x>4) are considered insoluble due to their relatively less polar nature, while the short-chain species $Li_2S_x$ (x≤4) are highly soluble (over 4 M) due to their more ionic nature (Li, N., et al., *Energy Environ Sci* 7, 3307-3312 (2014) and U.S. Patent Appl. Publication No. 2013/122334). However, both species are insoluble in a water-in-bisalt electrolyte due to the high salt concentration. Conversely, the short-chain $Li_2S_x$ (x≤4) themselves can take water molecules from the highly-concentrated aqueous electrolyte forming a liquid anolyte, which is still not miscible with a water-in-bisalt electrolyte. Hence, the lithiation process of sulfur anode in a water-in-bisalt electrolyte might include single solid-to-liquid phase transition, in accordance with the previously observed electrochemical behavior. However, since the formed $Li_2S_x$ (x<4) anolyte is immiscible with the water-in-bisalt electrolyte, the parasitic shuttle reactions of polysulfides that has plagued non-aqueous Li/S chemistry are effectively eliminated.

Figure 9:
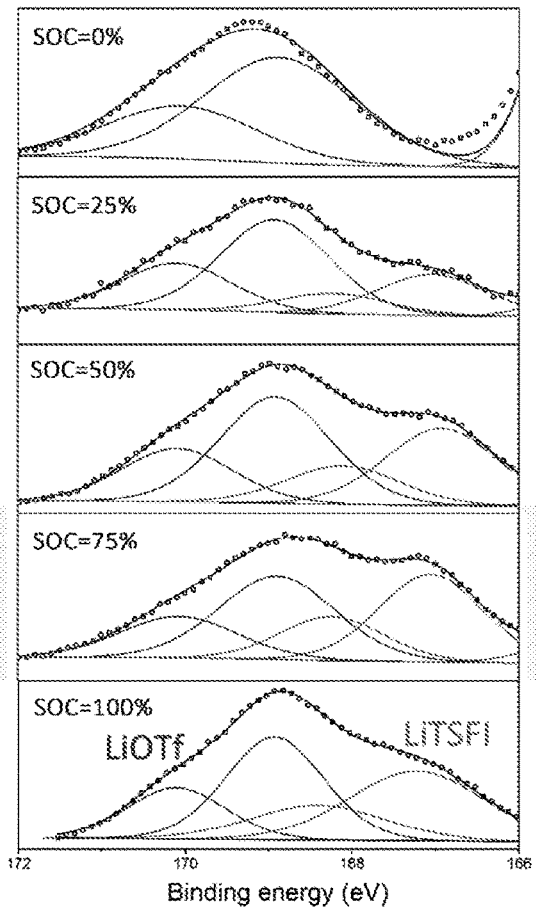
FIG. 9 is an ex-situ XPS S 2p spectra of a S-KB anode with the binding energy (BE) over 166 eV in full cell after charge to specific states. Black dotted lines are experimental data and black lines are overall fitted data and fitted individual environments in salt anions: $2p_{3/2-blue}$(LiOTf) 168.9 eV and $2p_{3/2-red}$(LiTFSI) 167.2 eV.

Ex-situ X-ray photoelectron spectroscopic (XPS) analysis was conducted on the S-KB anodes that were retrieved from the full cells at different SOCs of the third charge process (FIG. 5). For clarity, only the $2p_{3/2}$ component of the $2p_{3/2}/2p_{1/2}$ doublet was analyzed. Since the peaks at a binding energy over 166 eV are dominated by the contributions from LiTFSI and LiOTf salt anions residuals as demonstrated in FIG. 9, only the spectra in the range of 158-166 eV were selected to fit the S2p of $S_8$, $S^0$, $S^{1-}$, and $S^{2-}$, (FIG. 5) (Su, Y. S., et al., *Nat Commun* 4, 2985 (2013); Pang, Q., et al., Nat Commun 5, 4759 (2014); and Liang, X., et al., *Nat Commun* 6, 5682 (2015)). At SOC=0%, only $S_8$ (164.4 eV) was observed, while polysulfide species $S_x^{2-}$ (8≥x≥2) appeared during lithiation, which were fitted with $S^0$ at 163.5 eV and $S^{-1}$ at 161.7 eV, respectively. In the chain structure of the $S_x^{2-}$ species, the two terminal sulfur atoms at both ends bear a formal charge of −1, with several bridging sulfur atoms in the middle bearing a formal charge of 0. The average oxidation states were thus determined by the ratio of terminal/bridging sulfur peaks, leading to the average LiPS formula approximately equal to $Li_2S_6$ (SOC=25%), $Li_2S_4$ (SOC=50%), and $Li_2S_3$ (SOC=75%), respectively (FIG. 6). Interestingly, the XPS spectra showed that $Li_2S$, represented by $S^{2-}$ at 159.9 eV, was generated immediately after lithiation. The fully lithiated product $Li_2S$ normally appears only in the latter period or even the last stage of lithiation due to the slow reaction kinetics in the non-aqueous Li—S battery (Su, Y. S., et al., *Nat Commun* 4, 2985 (2013) and Pang, Q., et al., *Nat Commun* 5, 4759 (2014)). The early appearance of $Li_2S$ in the water-in-bisalt electrolyte indicates a rather fast kinetics for the lithiation reactions. At the end of the lithiation (SOC=100%), unsurprisingly, $Li_2S$ becomes the dominant species (72%), in excellent accordance with the 79% of the theoretical capacity obtained in previous electrochemical performance.

Figures 11, 12, 13, 14, 15:
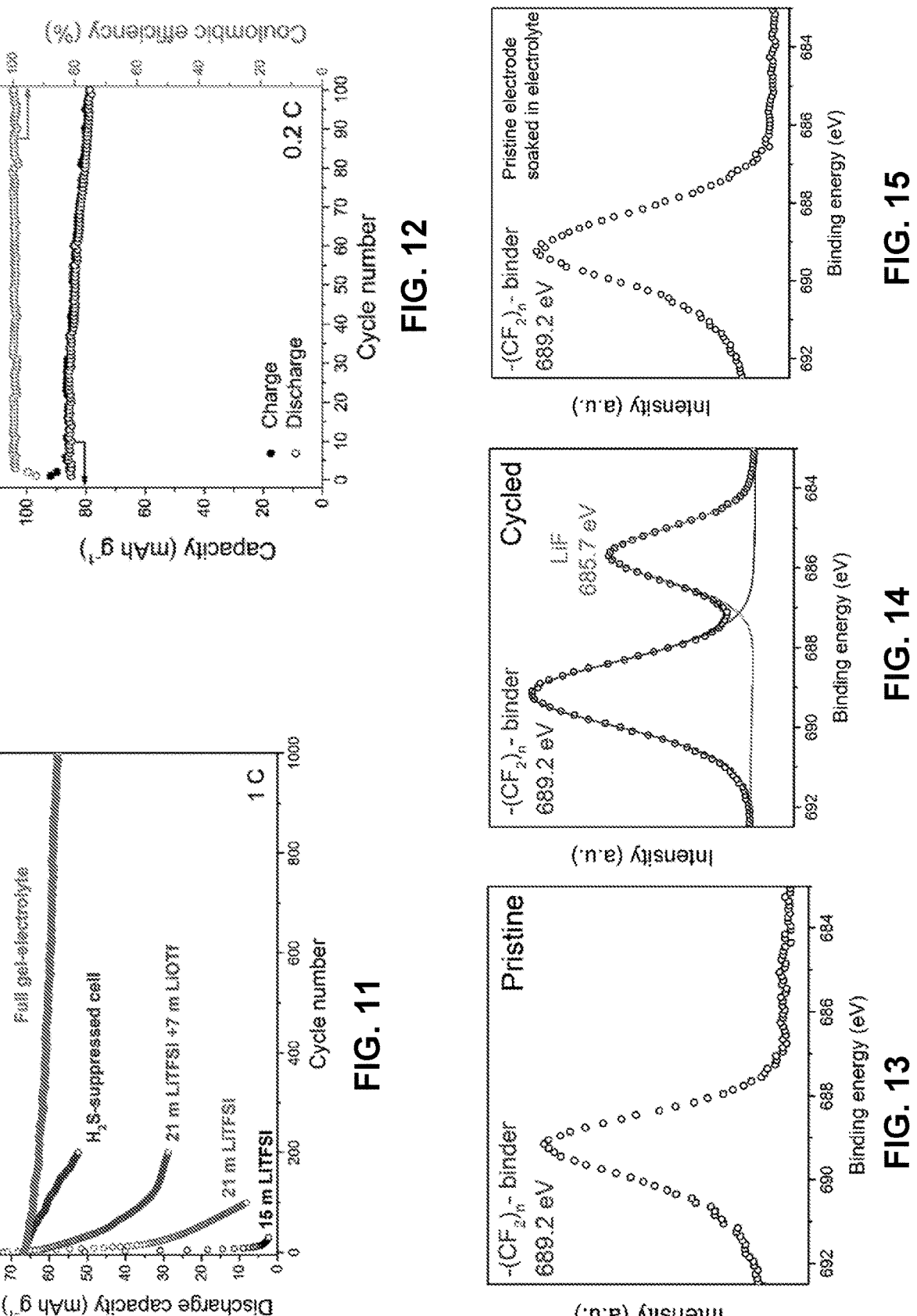
FIG. 11 is a graph showing the cycling performances of various aqueous S-KB/$LiMn_2O_4$ full cells at 1 C rate.
FIG. 12 is a graph showing the cycling stability of S-KB/$LiMn_2O_4$ full cells in aqueous hydrogel electrolyte at low rate of 0.2 C.
FIG. 13 is an ex-situ XPS F is spectra of S-KB anode in full cell before three cycles. Black dotted lines are experimental data.
FIG. 14 is an ex-situ XPS F is spectra of S-KB anode in full cell after three cycles. Black dotted lines are experimental data and solid lines are fitted individual environments: —$(CF_2)_n$— 689.2 eV and LiF 685.7 eV.
FIG. 15 is an ex-situ XPS F is spectra of a pristine S-KB anode soaked in a water-in-bisalt electrolyte without cycling. Black dotted lines are experimental data.

Formation of LiF-based SEI was again confirmed by a conspicuous change of F is XPS spectra before and after three lithiation cycles (FIG. 13 and FIG. 14). The pristine anode only showed a single peak at 689.5 eV, resulting from poly(tetrafluoroethylene) (PTFE) used as binder in the composite electrode. After three full lithiation cycles, an additional peak of F1s was detected at 685.7 eV, which was identified as $F^{1-}$ in LiF, indicating that a LiF-rich interphase already formed and covered the S-KB composite surface, which served as an electron barrier and prevented the reduction of water while allowing $Li^+$ migration (Suo, L., et al., *Science* 350, 938-943 (2015); Suo, L., et al., *Angewandte Chemie International Edition* 55, 7136-7144 (2016)). The possibility that LiF was being created by X-ray irradiation as an artifact was excluded by a control experiment, in which a pristine anode was soaked in the water-in-bisalt electrolyte without cycling, and generated the resultant spectra in absence of 685.7 eV peak (FIG. 15).

The S-KB composite in the water-in-bisalt electrolyte seemed to follow a similar lithiation pathway to that in non-aqueous electrolytes, represented by the formation of predominately $Li_2S_6$, $Li_2S_4$, $Li_2S_2$ and $Li_2S$ active materials (Zhang, S., et al., *Advanced Energy Materials* 5, 1500117 (2015) and Bruce, P. G., et al., *Nat Mater* 11, 19-29 (2012)). Short-chain LiPS ($Li_2S_x$, x<6) are considered to be highly soluble in aqueous solutions (Li, N., et al., *Energy Environ Sci* 7, 3307-3312 (2014)), which was confirmed by the formation of water-solvated species detected in LiPS Raman spectra. However, no LiPS was observed diffusing into the bulk electrolyte in in-situ Raman analysis of the electrolyte (FIG. 16), even after 50 cycles at 0.5 C. Scanning electron microscopy (SEM) images and corresponding energy-dispersive X-ray spectroscopy (EDX) of sulfur also demonstrated little change in the surface morphology of the S-KB anode (FIG. 17). This evidence, along with the excellent electrochemical behavior, suggested that the extremely high concentration of LiTF SI and LiOTf in the electrolyte effectively segregated the liquid short-chain LiPSs from the water-in-bisalt electrolyte. In a more visual manner, asimple dissolution experiment (FIG. 7) confirmed that the solubility of $Li_2S$ powder and short-chain LiPS anolyte in the water-in-bisalt electrolyte is indeed negligible.

Figure 21:
FIG. 21 is a photographic image of 4 M $Li_2S_2$ and $Li_2S_4$ solutions. Both solutions are a dark red color.

The 4 M $Li_2S_2$ and $Li_2S_4$ solutions with jacinth color (FIG. 7 and FIG. 21) were nominally formed upon the 1:1 and 3:1 molar radio of sulfur to $Li_2S$ aqueous solution by following reaction:

$$Li_2S + S_{x-1} \rightarrow Li_2S_x (x<6) \qquad \text{(Equation 1)}.$$

Figure 22:
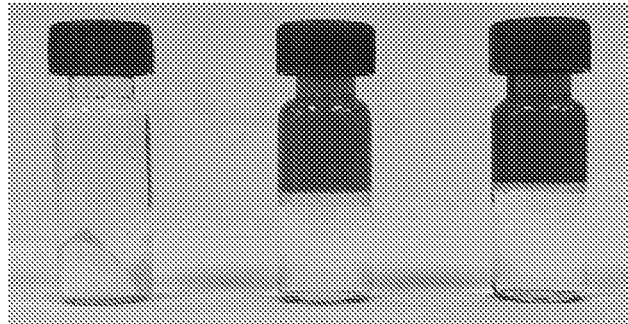
FIG. 22 is a photographic image of mixtures after 2 hours of $Li_2S$ powder with a 21 m LiTFSI solution (left image), $Li_2S_2$ and a 21 m LiTFSI solution (middle image), and $Li_2S_4$ and a 21 m LiTFSI solution (right image).
Figure 23:
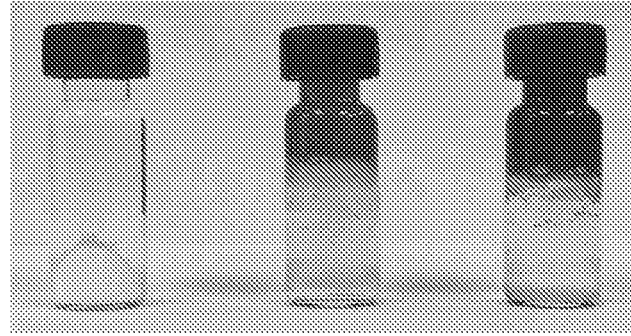
FIG. 23 is a photographic image of mixtures after 24 hours of $Li_2S$ powder with a 21 m LiTFSI solution (left image), $Li_2S_2$ and a 21 m LiTFSI solution (middle image), and $Li_2S_4$ and a 21 m LiTFSI solution (right image).

After mixing these LiPS solutions with 28 m of the water-in-bisalt electrolyte and after standing for 2 hours and 12 hours, a yellow boundary still existed between the two distinct phases, with the upper part being LiPS solutions due to their lower densities, and lower part the water-in-bisalt bulk electrolyte (FIG. 7). This was proven by their respectively Raman spectra (FIG. 24(*a*) and (*b*)). In sharp contrast, the same LiPS-$H_2O$ solution can still be miscible with the water-in-bisalt electrolyte with 21 m lithium salts, turning the clear electrolyte into a homogenous yellow solution (FIGS. 21-23), and the Raman spectra in FIG. 24(*c*) includes all the peaks from both the water-in-bisalt electrolyte and the LiPS solution. Therefore, the extra 7 m of Li salt in the water-in-bisalt electrolyte (and its lower content of water) played a critical role in stabilizing the short-chain LiPS solution. Carefully examining the yellow interlayer between the short-chain LiPS-H$_2$O solution and the water-in-bisalt electrolyte in FIG. 7, a cluster of white small solid particles was detected, which diffused from the yellow phase into clear electrolyte phase after 12 hours. Similar phenomenon was also observed in a full cell after long-term cycling (FIG. 25). These particles were collected by centrifugation and determined as elemental sulfur with Raman spectroscopy (FIG. 24). The elemental sulfur might be generated from a disproportionation reaction of metastable polysulfides with water by the following formula:

$$Li_2S_x + H_2O \leftrightarrows 2LiOH + H_2S(g) + S_{x-1}(s) \qquad \text{(Equation 2)}$$

which can be effectively suppressed by gel electrolytes.

A Li$^+$/S full cell was constructed using a S-KB anode coupled with a LiMn$_2$O$_4$ cathode (FIG. 26) in a water-in-bisalt electrolyte, and its electrochemical behavior was evaluated at different current densities (FIG. 28). The cathode/anode mass ratio was set at 6.85:1 in order to match their capacities. The areal sulfur loadings in the S-KB anode reached a high value of ~8 mg cm$^{-2}$, close to the load of active materials in a commercial cell (Qie, L., et al., *Advanced Energy Materials* 6, 1502459 (2016)). Remarkably, at 0.2 C (discharge/charge of full theoretical capacity in 5 hours), the cell exhibited a single discharge plateau with an average voltage of 1.60 V, delivering a discharge capacity of 84.40 mAh per gram of total electrode mass with coulombic efficiency of 99.8%. The energy density was conservatively estimated to be ~135 Wh/kg (of total electrode mass), which represents a marked improvement not only over the average for all previous aqueous Li-ion systems (<75 Wh/kg), but also over what has been achieved by the highly concentrated aqueous electrolytes. At a rate 5-times higher (1 C), the capacity only took a modest drop to 68.24 mAh/g, reflecting the fast kinetics for the cell reactions.

Galvanostatic intermittent titration experiments (GITT) were conducted (FIG. 29) on S-KB/LiMn$_2$O$_4$ full cell with the capacity of LiMn$_2$O$_4$ in 5 times excess to examine the reaction kinetics of the S-KB anodes. A constant current (0.1 C) was applied as short pulses, between which the system was allowed to relax to quasi-equilibrium. Remarkably, a reversible capacity close to theoretical value of sulfur (1,667 mAh/g) was achieved during the first cycle under this quasi-equilibrium condition, which can hardly be achieved in non-aqueous systems (Busche, M. R., et al., *J Power Sources* 259, 289-299 (2014); and Park, J.-W., et al., *The Journal of Physical Chemistry C* 117, 4431-4440 (2013)). Moreover, the gap between the potential at the end of each pulse (polarization potential; the solid line) and the potential at the end of each relaxation (quasi-equilibrium potential; the wavy line) were consistently low at 30-80 mV during most of the charge/discharge processes, except at the end of charge/discharge due to the increase in concentration polarization. This small overpotential further confirms the fast lithiation/delithiation kinetics of S-KB anode in the water-in-bisalt electrolyte. In sharp contrast, the lithiation process in typical non-aqueous DOL-DME based electrolytes normally undergoes three distinct stages with varying kinetics, which correspond to phase changes from solid S$_8$ to soluble S$_x^{2-}$species (x>4) followed by isolated solid Li$_2$S$_x$ (x=2 and 1). The single-potential plateau similar to this work was also observed in Li–S cell in solid state electrolyte (Cuisinier, M., et al., *Energy & Environmental Science* 7, 2697 (2014), but with much higher overpotentials.

Figure 10:
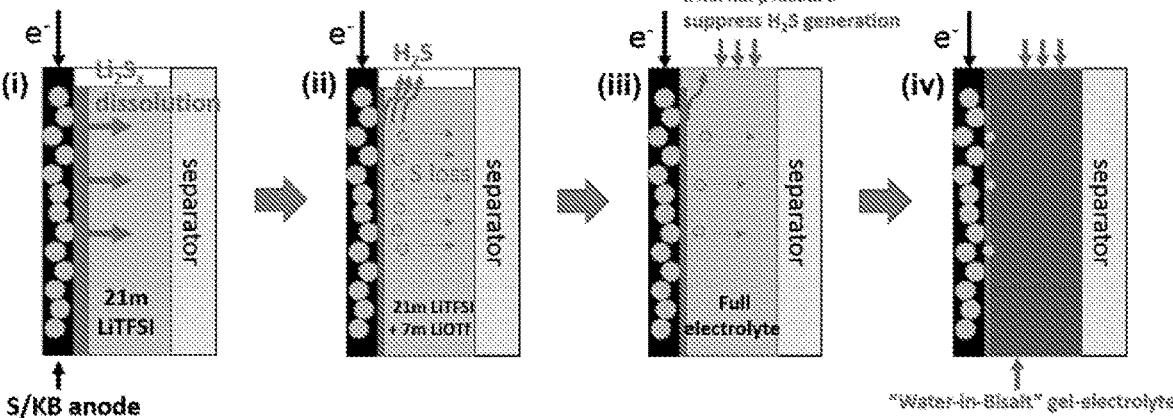
FIG. 10 is a schematic representation illustrating effective strategies (i-iv) to progressively suppress the parasitic reactions and improve cycling stability.

Cycling stability has always been an issue for non-aqueous Li/S batteries, whose capacity fades rapidly due to the dissolution of the polysulfide intermediates and the parasitic shuttling reactions thereafter, which results in self-discharge within the cell as well as continuous loss of active materials. Unfortunately, these undesired processes also take place in 15 m and 21 m "water-in-salt" electrolytes (represented by (i) in FIG. 10), although somehow these were suppressed in the 28 m water-in-bisalt electrolyte because of the polysulfide insolubility (represented by (ii) in FIG. 10). Compared with the drastic capacity decays in diluted aqueous electrolytes (15 m or 21 m LiTFSI solutions), the cycling stability of full Li-ion/sulfur cell with 28 m water-in-bisalt electrolyte was significantly improved (FIG. 11) due to the immobilization of the polysulfide species; however, a serious capacity decay of 66% over 200 cycles at 1 C indicated that the disproportionation reaction of LiPS with water (Equation 2) still prevailed. This side reaction slowly created element sulfur particles and H$_2$S gas during repeated charge/discharge, resulting in a major loss of active material (FIG. 24 and FIG. 25). Fortunately, this side reaction can be mitigated by removing the empty voids through fully flooding the cell with electrolyte (represented by (iii) in FIG. 10). Aided by the low solubility of HS$^-$, a moderate internal pressure was built up in the well-sealed cell, which shifted the chemical equilibrium and forced H$_2$S to be converted back to active sulfur. Unexpectedly, by using this strategy, the capacity retention improved to 62% over 200 cycles at 1 C. The effectiveness of this strategy in suppressing the side reaction was also evaluated by measuring the self-discharge rate of a cell at SOC of 100% and 75% (FIGS. 30-32). As expected, pronounced increase in retained discharge capacity was observed in the pressurized cell after a 12 hour open-circuit relaxation (FIG. 31). The LiPS intermediate in the S-KB anode at SOC of 75% corresponds to an average formula of Li$_2$S$_3$, which has been considered the most active for the disproporationation reactions. Further efforts were made to immobilize such active materials through "solidifying" the water-in-bisalt electrolyte by forming a polymeric gel (represented by (iv) in FIG. 10). A hydrophilic polymer polyvinyl alcohol (PVA), which has been widely used as matrix in solid-state supercapacitors (Peng, X., et al., *Nat Commun* 7, 11782 (2016); and Wu, C., et al., *Nat Commun* 4, 2431 (2013)), was introduced into the 28 m water-in-bisalt electrolyte to form a hydrogel (FIG. 32). This gel polymer electrolyte (GPE) shown in FIG. 32 and FIG. 33, has the similar ion migration rate as its parental aqueous electrolyte, as evidenced by electrochemical impedance spectroscopy (EIS) which revealed almost identical impedances for S-KB/LiMn$_2$O$_4$ full cells in GPE as well as the water-in-bisalt electrolyte in the course of 50 cycles. (FIG. 36). The S-KB/LiMn$_2$O$_4$ in this 28 m GPE also showed almost identical charge/discharge profiles as that in 28 m the water-in-bisalt electrolyte (FIG. 34), but the hydrophilic polymer matrix is expected to further constrain the water molecules already bound by ions (Equation 2), while providing a physical barrier to block the loss of sulfur into bulk aqueous electrolyte. This approach effectively maintains the sulfur in active electrochemical state, thus significantly reducing capacity decay to 7% in the first 200 cycles at 1 C. More importantly, after 1,000 cycles at 1 C, the capacity still retained 86% of its initial value, corresponding to a very small capacity decay of 0.014% per cycle. This low fading rate is the best observed in all non-aqueous and aqueous lithium-sulfur batteries. Even at a low charge/discharge rate of 0.2 C, which has always been a challenge not only for Li/S system but in particular for all aqueous systems, the capacity decay was still only 9% after 100 cycles (FIG. 12). After formation of SEI on the anode surface in the initial 5 cycles, the average Coulombic efficiency was around 99.5%.

With a reversible lithiation/de-lithiation process of solid sulfur delivering a close-to-theoretical capacity and fast reaction kinetics demonstrated in an aqueous electrolyte for the first time, we created a unique Li-ion/sulfur (Li$^+$/S) chemistry with full cell configuration of LiMn$_2$O$_4$ cathode and S-KB anode, which operated within the expanded electrochemical stability window of the water-in-bisalt electrolyte, delivering an energy density of 135 Wh/kg. It should be noted that the energy density of the S-KB/LiMn$_2$O$_4$ cell is limited by the LiMn$_2$O$_4$ due to its low potential and small capacity. For practical applications where high energy density is desired, cathode candidates with higher specific capacity and redox potential can be used (FIG. 37). For example, high voltage LiCoO$_2$ (HV-LiCoO$_2$) with a capacity of 180 mAh/g (FIG. 39) would make a better cathode when coupled with sulfur (Z. Chen and J. R. Dahn, *Electrochim Acta* 49, 1079-1090 (2004)), raising the energy density to an unprecedentedly high level for aqueous batteries. Indeed, the full cell coupling HV-LiCoO$_2$ cathode with a S-KB anode delivered a stable discharge capacity of 119 mAh/gram of total electrode mass with an average voltage of 1.64 V at 0.2 C, leading to an energy density of 195 Wh/kg (FIG. 38). The theoretical value for the electrochemical couple of Sulfur/HV-LiCoO$_2$ (267 Wh/kg, FIG. 39) could be achieved with further optimization and engineering in cell design.

For an overview, aqueous Li$^+$/S batteries (FIG. 39) was also plotted against other successful aqueous systems reported previously. In most of the cases, energy densities were below 78 Wh/kg (Wang, H., et al., *Electrochim Acta* 52, 3280-3285 (2007); Wang, H., et al., *Electrochim Acta* 52, 5102-5107 (2007); and Luo, J. Y., et al., *Nat Chem* 2, 760-765 (2010)).

Unexpectedly, the aqueous hydrogel electrolytes retain the same wide electrochemical stability window as the liquid electrolytes against hydrolysis. The aqueous hydrogel electrolytes can suppress the reduction of water down to a potential of 1.9 V vs. Li, and the oxidation of water up the potential of ~4.9 V vs. Li. This will enable a lot of electrochemical couples, including sulfur, selenium, LiVPO$_4$F, Li$_4$Ti$_5$O$_{12}$, TiO$_2$, and Mo$_6$S$_8$ as anodes and LiMn$_2$O$_4$, LiCoO$_2$, LiVPO$_4$F, and Li$_{0.5}$Mn$_{1.5}$O$_4$ as cathodes.

And, the hydrophilic polymer matrix in the aqueous hydrogel electrolyte is expected to further constrain the water molecules already bound by ions, preventing lithium polysulfide (the reaction intermediate in a sulfur battery) being miscible with the electrolytes. Meanwhile, it provides a physical barrier to block the loss of sulfur, which generated from a disproportionation reaction of metastable polysulfide with water, into bulk aqueous electrolyte. This approach effectively maintains the sulfur in an active electrochemical state, thus significantly reducing capacity decay.

The aqueous hydrogel electrolyte also provides a promising solution to decrease the cost of "water-in-salt" and water-in-bisalt aqueous electrolytes. The aqueous hydrogel electrolyte using other low-cost salts such as LiNO$_3$ and Li$_2$SO$_4$, was shown to be immiscible with the aqueous high concentration LiTFSI and LITOf aqueous hydrogel electrolyte, by forming a stable interface between the two electrolytes. Hence, it is possible to coat the electrodes with a high concentration of LiTFSI and LiTOf aqueous hydrogel electrolyte to suppress hydrolysis, and use the other low cost salt aqueous hydrogels as the major electrolyte to reduce the cost of the battery.

Having now fully described this invention, it will be understood by those of ordinary skill in the art that the same can be performed within a wide and equivalent range of conditions, formulations and other parameters without affecting the scope of the invention or any embodiment thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

All patents and publications cited herein are fully incorporated by reference herein in their entirety.

We claim:

1. An electrochemical cell comprising:
   (a) an anode comprising sulfur;
   (b) a cathode; and
   (c) an aqueous hydrogel electrolyte comprising between about 25 m and about 50 m of at least one metal salt, at least one solvent comprising between about 1% and about 100% water by weight, and at least one hydrophilic polymer so as to form a hydrogel having a hydrophilic polymer matrix, wherein the anode is capable of forming decomposition products, wherein the decomposition products comprise one or more metal polysulfides, wherein the decomposition products are phase-separated from the electrolyte, and wherein the aqueous hydrogel electrolyte floods the cell so as to define an internal pressure and a capacity retention of the cell of at least 62% over 200 cycles at 1 C.

2. The electrochemical cell of claim 1, wherein the at least one metal salt comprises a metal ion selected from the group consisting of Li$^+$, Na$^+$, K$^+$, Mg$^{2+}$, and Al$^{3+}$.

3. The electrochemical cell of claim 1, wherein the at least one metal salt comprises an anion selected from the group consisting of bis(trifluoromethane sulfonyl)imide (TFSI), trifluoromethane sulfonate (OTf), bis(fluorosulfonyl)imide (FSI), tetrafluorophosphate (BF$_4$), hexafluorophosphate (PF$_6$), bis(pentafluoroethane sulfonyl) imide (BETI), 4,5-dicyano-2-trifluoromethanoimidazole (DCMI), imide (FNF), perchlorate (ClO$_4$), sulfate (SO$_4$), and nitrate (NO$_3$).

4. The electrochemical cell of claim 1, wherein the at least one metal salt is selected from the group consisting of lithium bis (trifluoromethane sulfonyl)imide, lithium trifluoromethane sulfonate, lithium bis(fluorosulfonyl)imide, lithium bis(pentafluoroethane sulfonyl)imide, lithium 4,5-dicyano-2-trifluoromethanoimidazole, lithium [fluoro(nonafluorobutane) sulfonyl)]imide, lithium perchlorate, lithium sulfate, lithium nitrate, sodium bis(trifluoromethane sulfonyl)imide, sodium trifluoromethane sulfonate, sodium bis (fluorosulfonyl)imide, sodium bis(pentafluoroethane sulfonyl)imide, sodium 4,5-dicyano-2-trifluoromethanoimidazole, sodium [fluoro (nonafluorobutane) sulfonyl)]imide, sodium perchlorate, sodium sulfate, sodium nitrate, potassium bis(trifluoromethane sulfonyl)imide, potassium trifluoromethane sulfonate, potassium bis(fluorosulfonyl)imide, potassium bis(pentafluoroethane sulfonyl)imide, potassium 4,5-dicyano-2-trifluoromethanoimidazole, potassium [fluoro(nonafluorobutane) sulfonyl)]imide, potassium perchlorate, potassium sulfate, potassium nitrate, magnesium bis(trifluoromethane sulfonyl)imide, magnesium trifluoromethane sulfonate, magnesium bis(fluorosulfonyl)imide, magnesium bis(pentafluoroethane sulfonyl)imide, magnesium 4,5-dicyano-2-trifluoromethanoimidazole, magnesium [fluoro(nonafluorobutane) sulfonyl)]imide, magnesium perchlorate, magnesium sulfate, magnesium nitrate, aluminum bis(trifluoromethane sulfonyl)imide, aluminum trifluoromethane sulfonate, aluminum bis(fluorosulfonyl)imide, aluminum bis(pentafluoroethane sulfonyl)imide, aluminum 4,5-dicyano-2-trifluoromethanoimidazole, aluminum [fluoro(nonafluorobutane) sulfonyl)]imide, lithium perchlorate, aluminum sulfate, and aluminum nitrate.

5. The electrochemical cell of claim 1, wherein the at least one hydrophilic polymer is selected from the group consisting of a poly(N-isopropylacrylamide), a polyacrylamide, a poly(2-oxazoline), a polyethyleneimine, a poly(acrylic acid), a polymethacrylate, a poly(ethylene glycol), a poly(ethylene oxide), a poly(vinyl alcohol), and a poly(vinylpyrrolidine).

6. The electrochemical cell of claim 1, wherein the cathode is a lithium metal oxide or a lithium metal phosphate.

7. The electrochemical cell of claim 1, wherein the cathode is selected from the group consisting of $LiFePO_4$, $LiMn_2O_4$, $LiCoO_2$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, $LiVPO_4F$, and $LiMnPO_4$.

8. The electrochemical cell of claim 1, wherein the at least one hydrophilic polymer comprises poly(vinyl alcohol), the cathode comprises $LiMn_2O_4$ or $LiCoO_2$, the anode comprises sulfur-Ketjenblack, and the at least one solvent comprises the metal salts LiTFSI and LiOTf.

9. The electrochemical cell of claim 1, wherein the capacity decay rate (mAh/g) at a C-rate of about 2.5 C is between about 0.005% and about 0.1% per cycle.

10. The electrochemical cell of claim 1, wherein the energy density at a C-rate of about 0.5 C is between about 20 Wh/kg and about 200 Wh/kg.

11. The electrochemical cell of claim 1, wherein the at least one metal salt comprises a metal ion comprising $Li^+$, $Na^+$, $K^+$, $Mg^{2+}$, or $Al^{3+}$.

12. The electrochemical cell of claim 1, wherein the at least one metal salt comprises an anion comprising bis(trifluoromethane sulfonyl)imide (TFSI), trifluoromethane sulfonate (OTf), bis(fluorosulfonyl)imide (FSI), tetrafluorophosphate (BF4), hexafluorophosphate ($PF_6$), bis(pentafluoroethane sulfonyl) imide (BETI), 4,5-dicyano-2-trifluoromethanoimidazole (DCMI), imide (FNF), perchlorate ($ClO_4$), sulfate ($SO_4$), or nitrate ($NO_3$).

13. The electrochemical cell of claim 1, wherein the at least one metal salt comprises LiTFSI, LiOTf, LiFSI, LiBETI, LiDCMI, LiFNF, $LiClO_4$, $LiSO_4$, $LiNO_3$, NaTF SI, NaOTf, NaFSI, NaBETI, NaDCMI, NaFNF, $NaClO_4$, $NaSO_4$, $NaNO_3$, KTFSI, KOTf, KFSI, KBETI, KDCMI, KFNF, $KClO_4$, $KSO_4$, $KNO_3$, $Mg(TFSI)_2$, $Mg(OTf)_2$, $Mg(FSI)_2$, $Mg(BETI)_2$, $Mg(DCMI)_2$, $Mg(FNF)_2$, $Mg(ClO_4)_2$, $Mg(SO_4)_2$, $Mg(NO_3)_2$, $Al(TFSI)_3$, $Al(OTf)_3$, $Al(FSI)_3$, $Al(BETI)_3$, $Al(DCMI)_3$, $Al(FNF)_3$, $Al(ClO_4)_3$, $Al(SO_4)_3$, or $Al(NO_3)_3$.

14. The electrochemical cell of claim 1, wherein the at least one hydrophilic polymer comprises a poly(N-isopropylacrylamide), a polyacrylamide, a poly(2-oxazoline), a polyethyleneimine, a poly(acrylic acid), a polymethacrylate, a poly(ethylene glycol), a poly(ethylene oxide), a poly(vinyl alcohol), or a poly(vinylpyrrolidine).

15. The electrochemical cell of claim 1, wherein the cathode comprises $LiFePO_4$, $LiMn_2O_4$, $LiCoO_2$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, $LiVPO_4F$, or $LiMnPO_4$.

16. The electrochemical cell of claim 1, wherein the anode comprises sulfur-Ketjenblack.

17. The electrochemical cell of claim 1, wherein the anode comprises sulfur-Ketjenblack and the decomposition products comprise lithium polysulfides.

18. The electrochemical cell of claim 1, wherein the aqueous hydrogel electrolyte comprises two metal salts.

19. The electrochemical cell of claim 1, wherein the aqueous hydrogel electrolyte comprises water-in-bisalt electrolyte and wherein the polymer matrix comprises polyvinyl alcohol mixed within the water-in-bisalt electrolyte;

the anode is sulfur-Ketjenblack;

the cathode is $LiMn_2O_4$ or $LiCoO_2$; and the cell has an energy density ranging from 135 Wh/kg to 195 Wh/kg.

\* \* \* \* \*